US012620863B2

(12) United States Patent
Kim et al.

(10) Patent No.: US 12,620,863 B2
(45) Date of Patent: May 5, 2026

(54) BUSBAR AND MOTOR COMPRISING SAME

(71) Applicant: LG INNOTEK CO., LTD., Seoul (KR)

(72) Inventors: Seong Jin Kim, Seoul (KR); Min Oak Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 614 days.

(21) Appl. No.: 18/010,004

(22) PCT Filed: Jun. 30, 2021

(86) PCT No.: PCT/KR2021/008254
§ 371 (c)(1),
(2) Date: Dec. 13, 2022

(87) PCT Pub. No.: WO2022/005197
PCT Pub. Date: Jan. 6, 2022

(65) Prior Publication Data
US 2023/0344302 A1 Oct. 26, 2023

(30) Foreign Application Priority Data

Jul. 3, 2020 (KR) ......................... 10-2020-0081990
Nov. 11, 2020 (KR) ......................... 10-2020-0149834

(51) Int. Cl.
*H02K 3/50* (2006.01)
*H02K 5/22* (2006.01)
*H02K 7/00* (2006.01)

(52) U.S. Cl.
CPC ............... *H02K 5/225* (2013.01); *H02K 3/50* (2013.01); *H02K 7/003* (2013.01)

(58) Field of Classification Search
CPC ...... H02K 3/50; H02K 3/505; H02K 2203/06; H02K 2203/09; H02K 3/38; H02K 5/225
See application file for complete search history.

(56) References Cited

U.S. PATENT DOCUMENTS

| | | | |
|---|---|---|---|
| 2008/0018193 A1 | 1/2008 | Kobayashi | |
| 2018/0123414 A1* | 5/2018 | Kim ......................... | H02K 3/18 |
| 2019/0348884 A1 | 11/2019 | Popa et al. | |

FOREIGN PATENT DOCUMENTS

| | | |
|---|---|---|
| CN | 203761166 | 8/2014 |
| JP | 2013-102596 | 5/2013 |

(Continued)

OTHER PUBLICATIONS

Sakiyama (JP 2013102596 A) English Translation (Year: 2013).*

(Continued)

*Primary Examiner* — Tulsidas C Patel
*Assistant Examiner* — Robert E Mates
(74) *Attorney, Agent, or Firm* — KED & ASSOCIATES

(57) ABSTRACT

An embodiment provides a motor comprising: a stator; a rotor arranged to correspond to the stator; a shaft coupled to the rotor; and a busbar disposed above the stator, wherein: the busbar comprises a busbar body and a plurality of busbar terminals disposed in the busbar body; each of the busbar terminals comprises a body part and a power terminal part coupled to the body part; the body part comprises a body, a plurality of terminal portions disposed in the body, and a protrusion protruding in the shaft direction from the upper surface of the body; and one surface of the lower portion of the power terminal part comes into contact with the inner surface of the protrusion. Accordingly, the motor uses the busbar terminal having the structure in which the power terminal part is coupled to the body part, and thus scraps produced during the formation of the busbar terminal can be minimized.

9 Claims, 29 Drawing Sheets

800

(56)     References Cited

FOREIGN PATENT DOCUMENTS

| JP | 2013102596 A | * | 5/2013 |
| JP | 2018-512037 | | 4/2018 |
| KR | 10-2017-0052980 | | 5/2017 |
| KR | 10-2017-0102744 | | 9/2017 |
| KR | 10-2019-0083787 | | 7/2019 |
| KR | 10-2051599 | | 1/2020 |
| WO | WO 2019/064877 | | 4/2019 |

OTHER PUBLICATIONS

Japanese Office Action dated Jan. 28, 2025 issued in Application No. 2022-578824.
International Search Report dated Oct. 12, 2021 issued in Application No. PCT/KR2021/008254.
Korean Office Action dated Aug. 25, 2025 issued in Application No. 10-2020-0149834.

* cited by examiner

[FIG. 1]
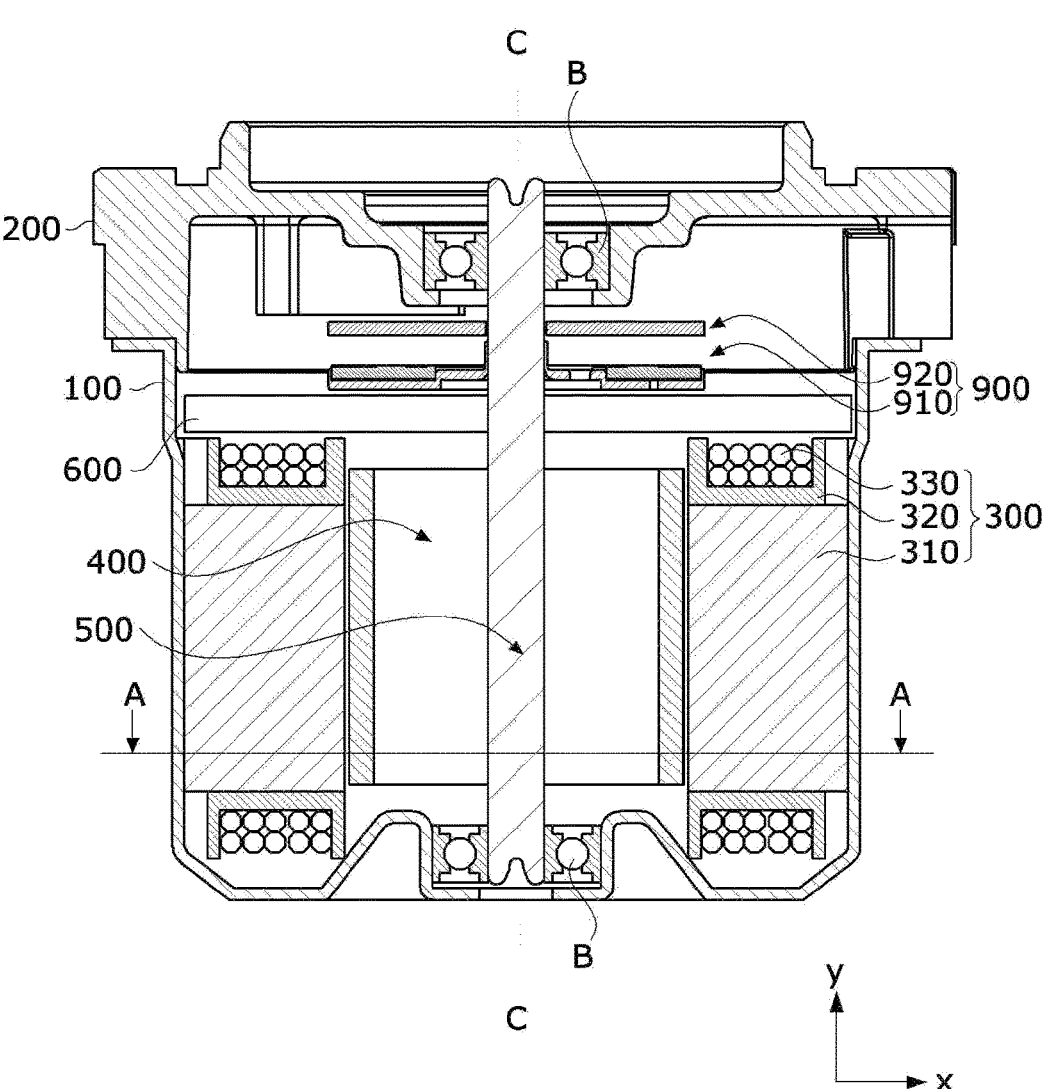

[FIG. 2]
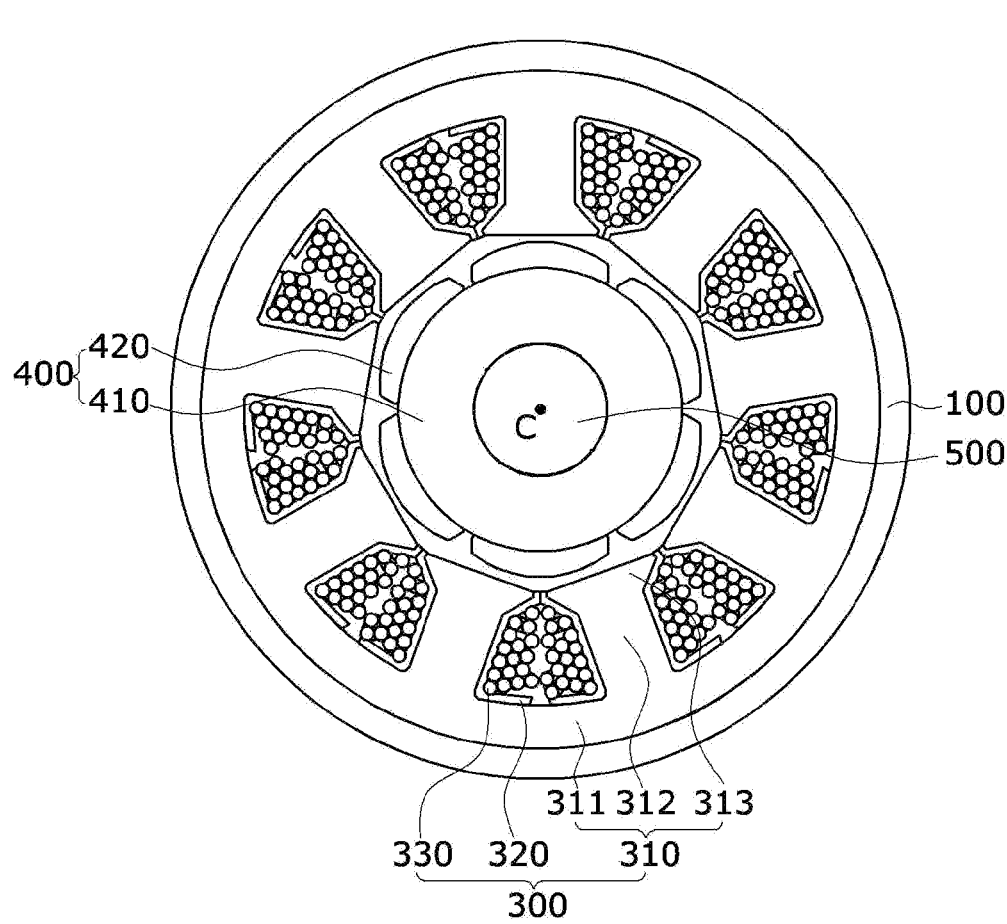

[FIG. 3]
<u>600</u>
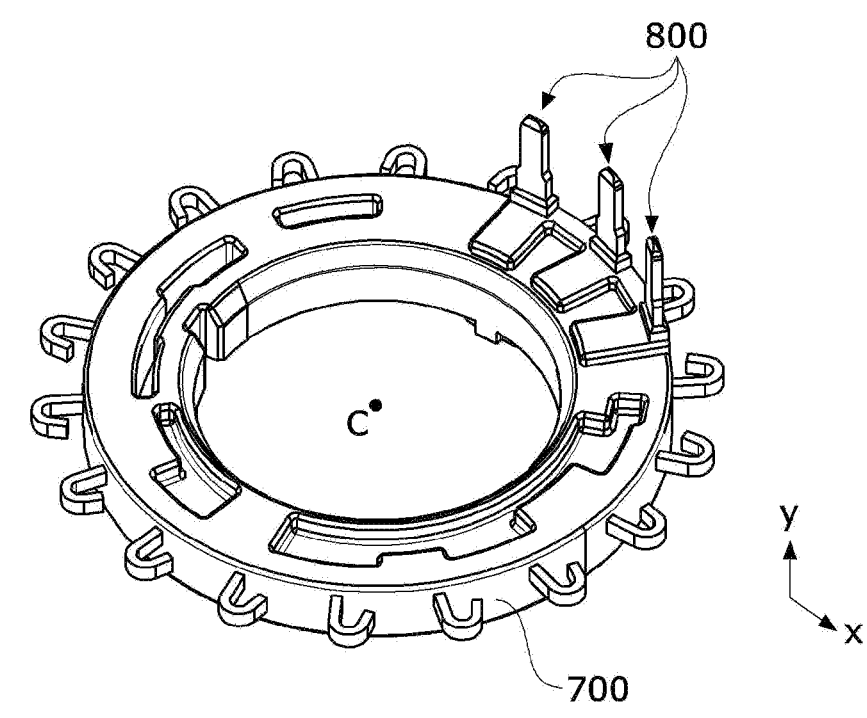
[FIG. 4]
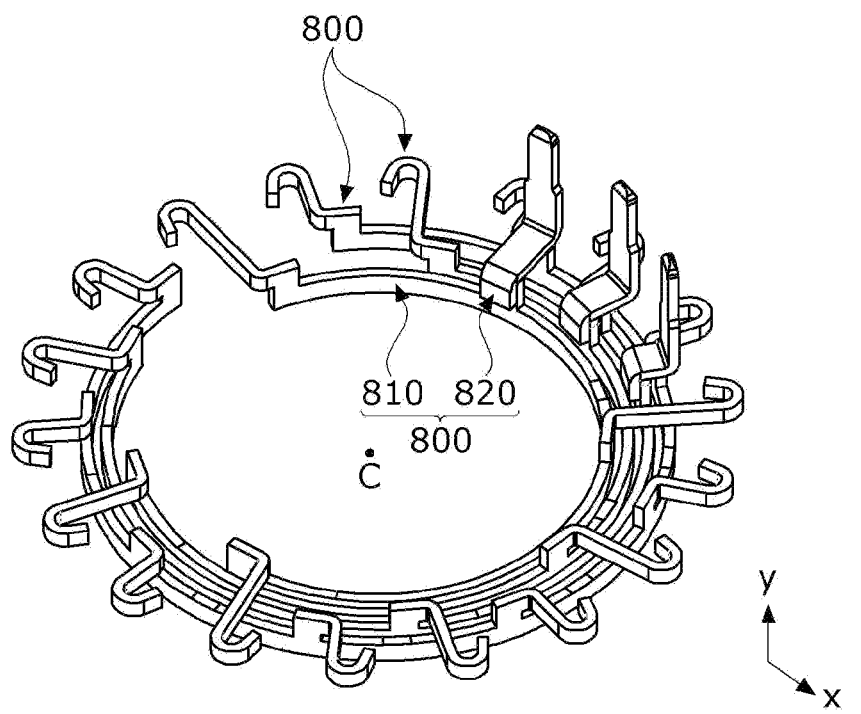

[FIG. 5]
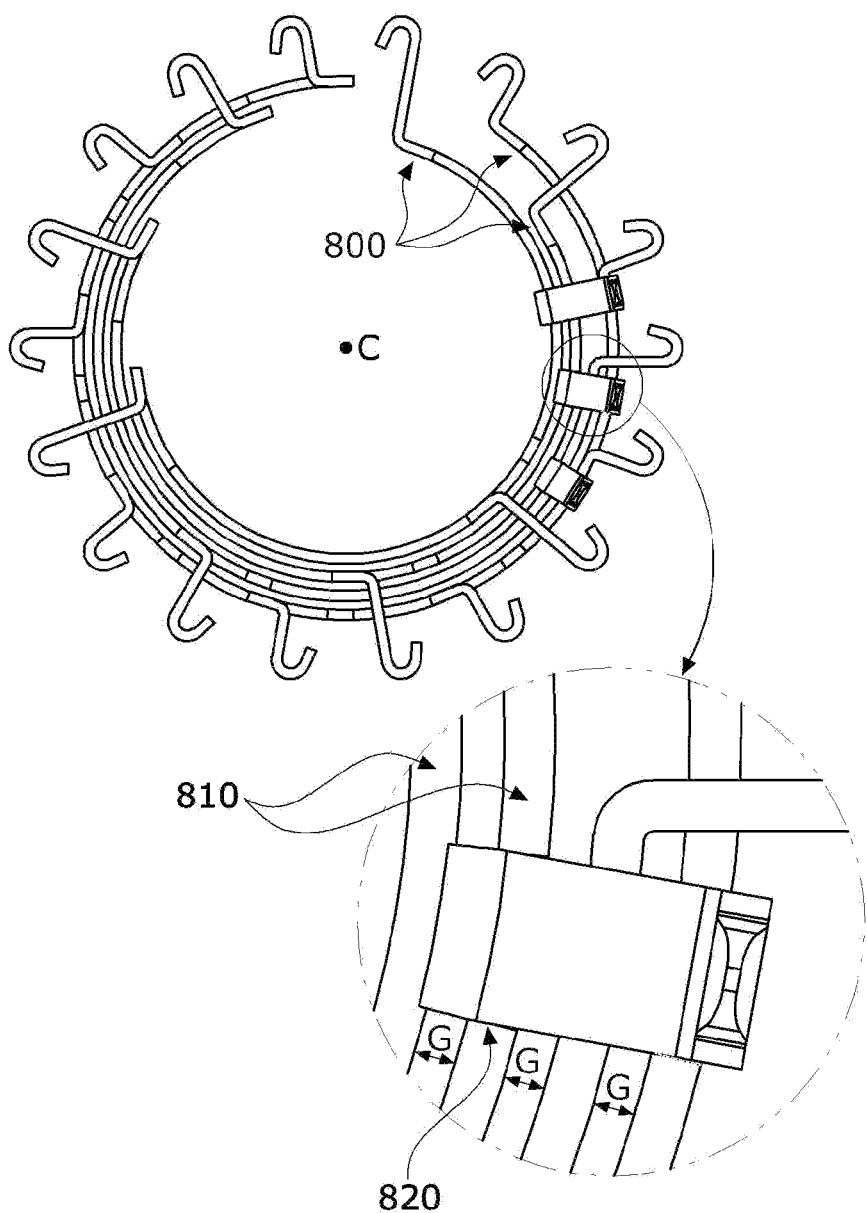
[FIG. 6]
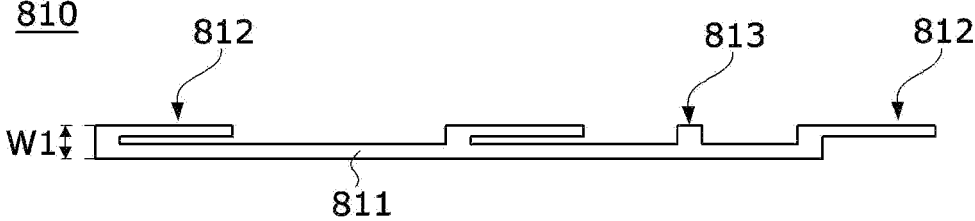

[FIG. 9]
800
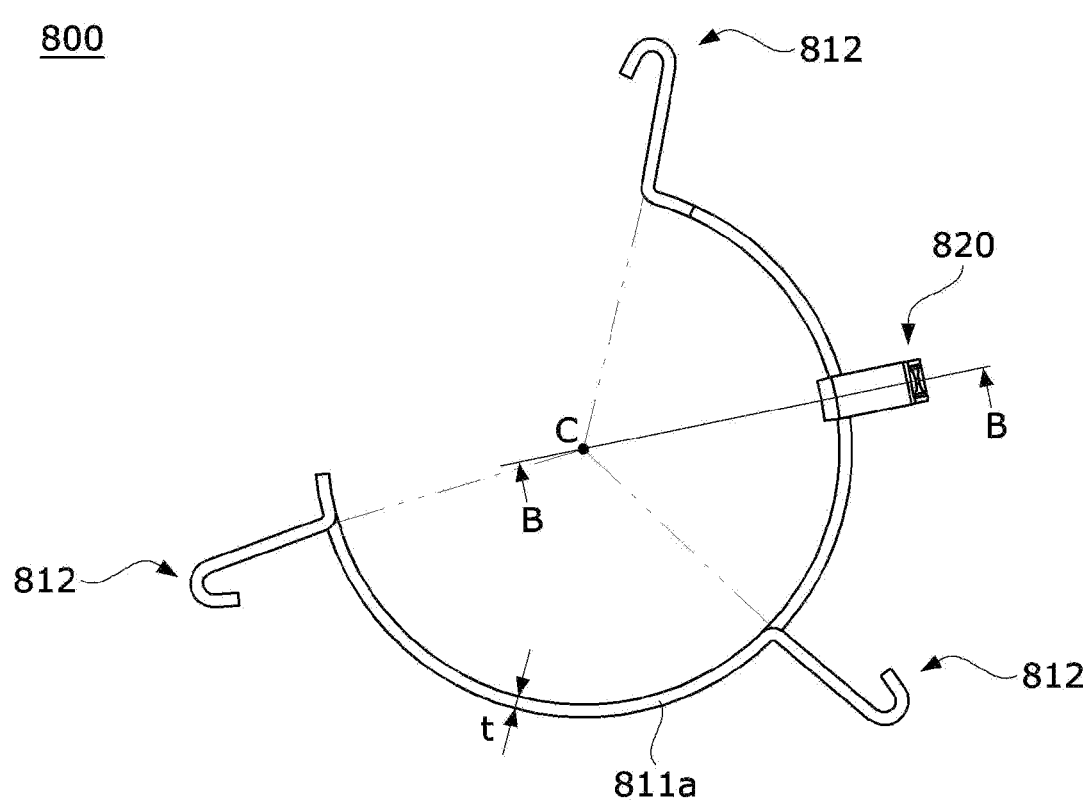

[FIG. 10]

[FIG. 11]
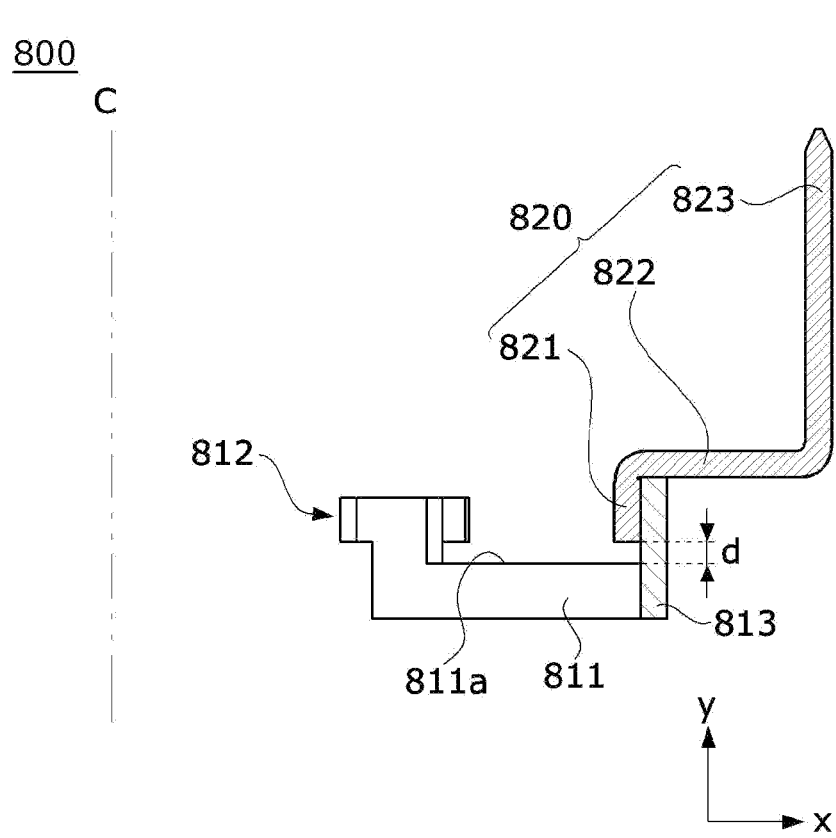

[FIG. 12]
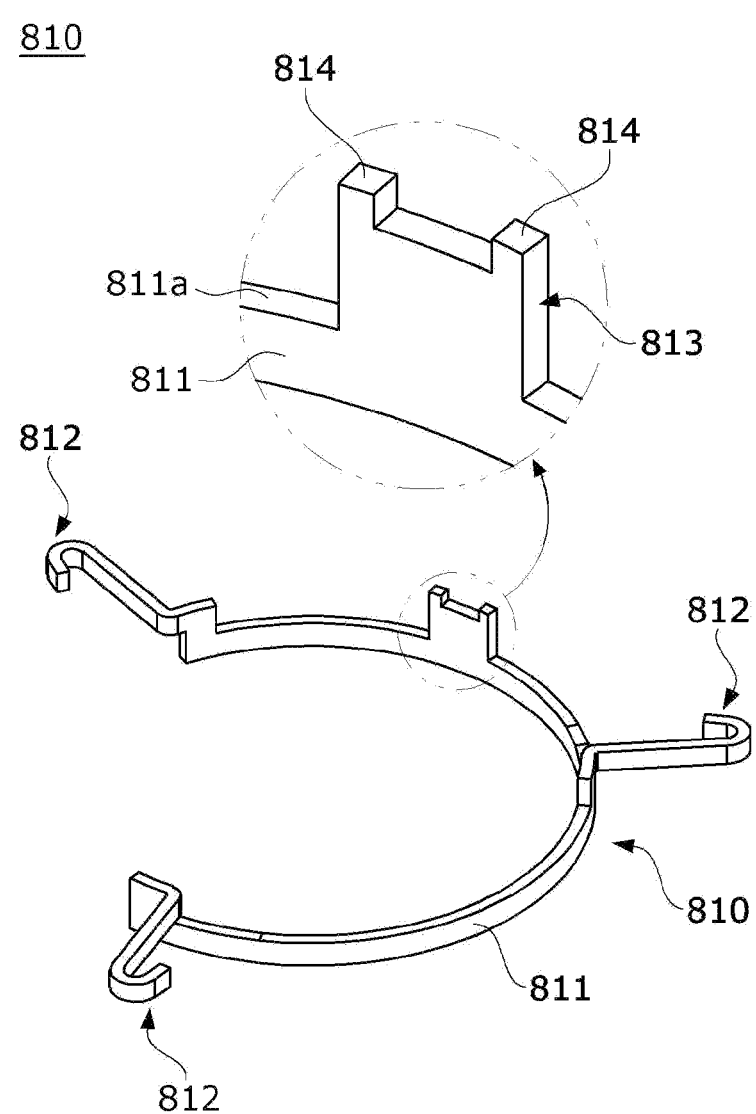

[FIG. 13]
<u>800a</u>
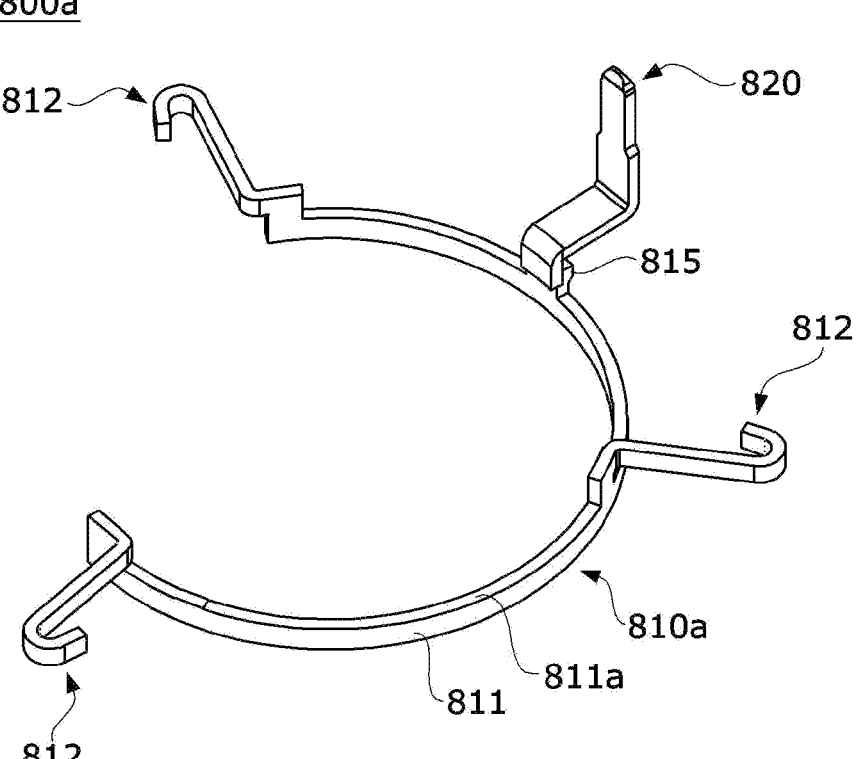

[FIG. 14]
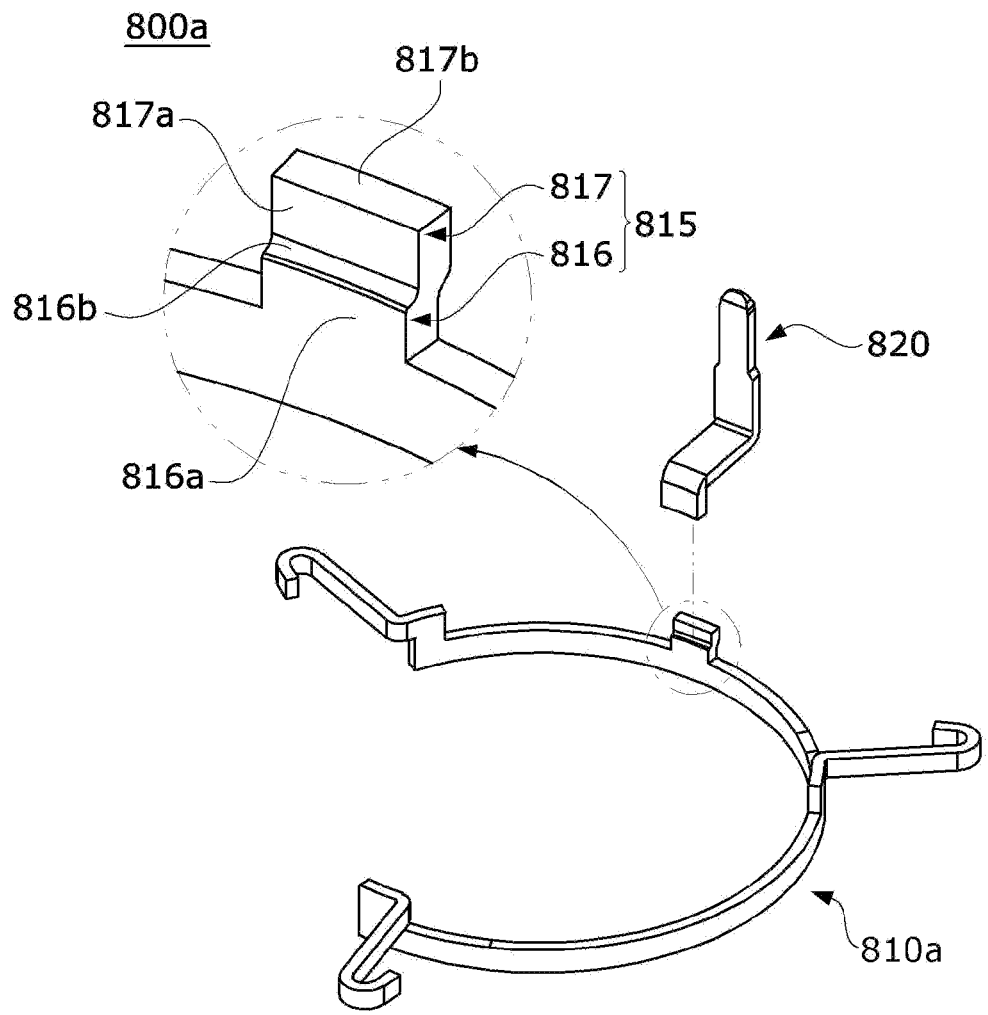

[FIG. 15]
<u>800a</u>
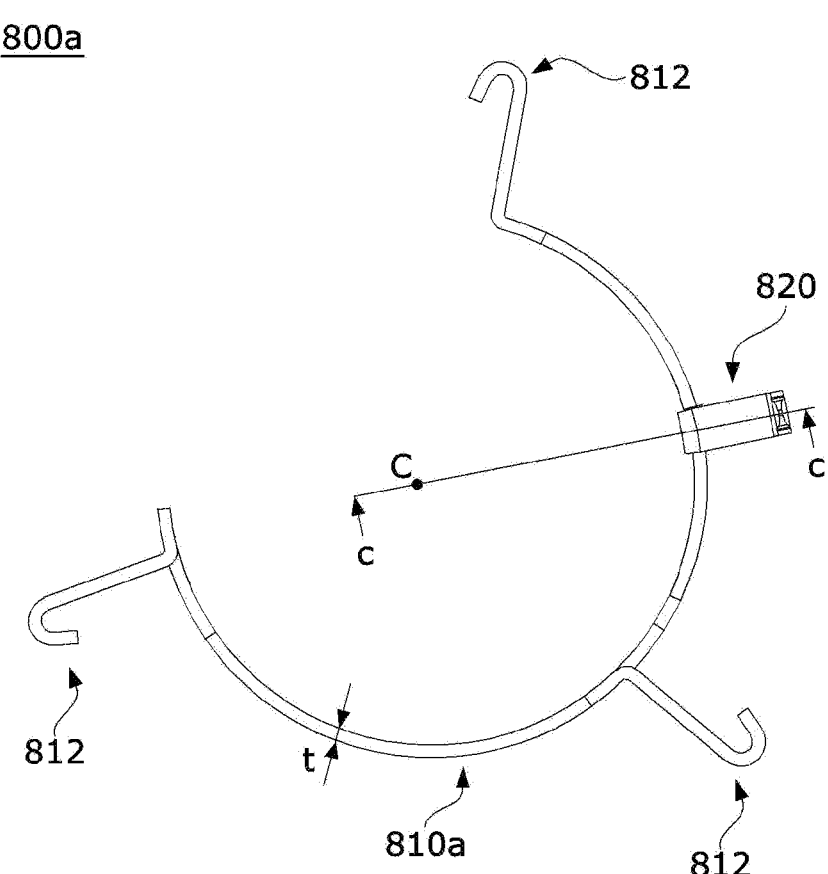

[FIG. 16]
<u>800a</u>
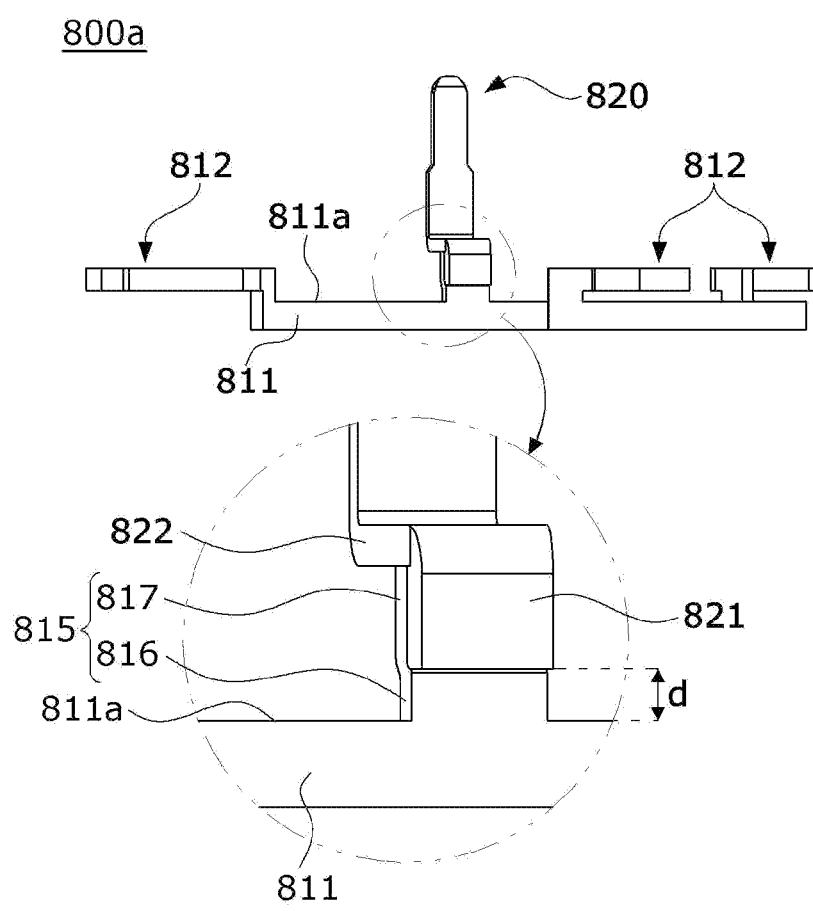

[FIG. 17]
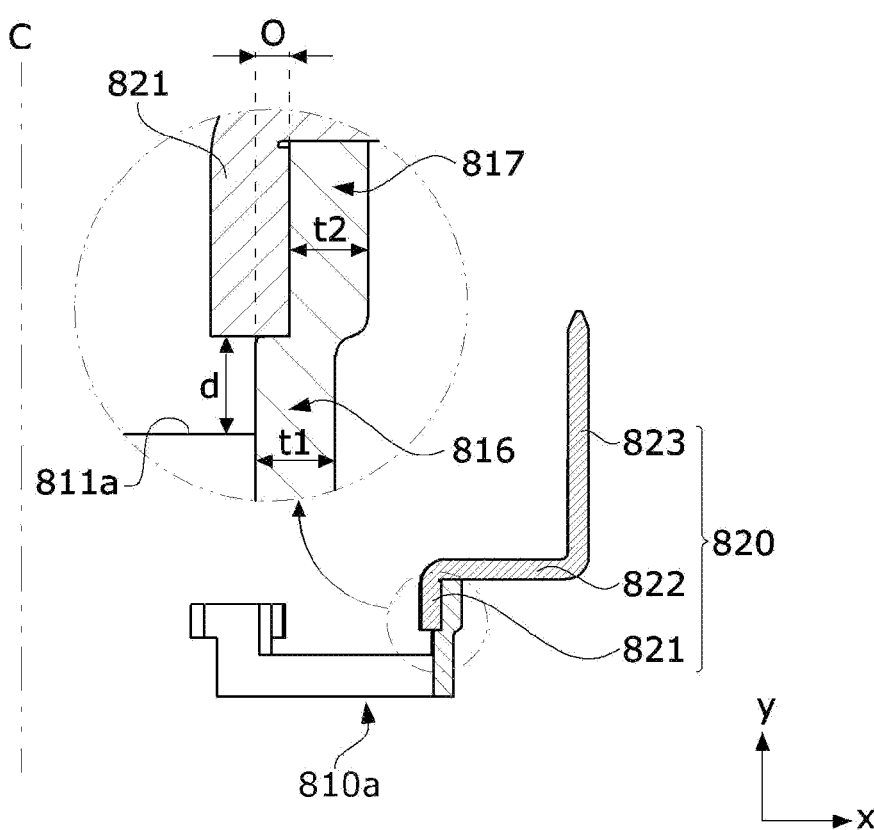

[FIG. 18]
<u>810a</u>
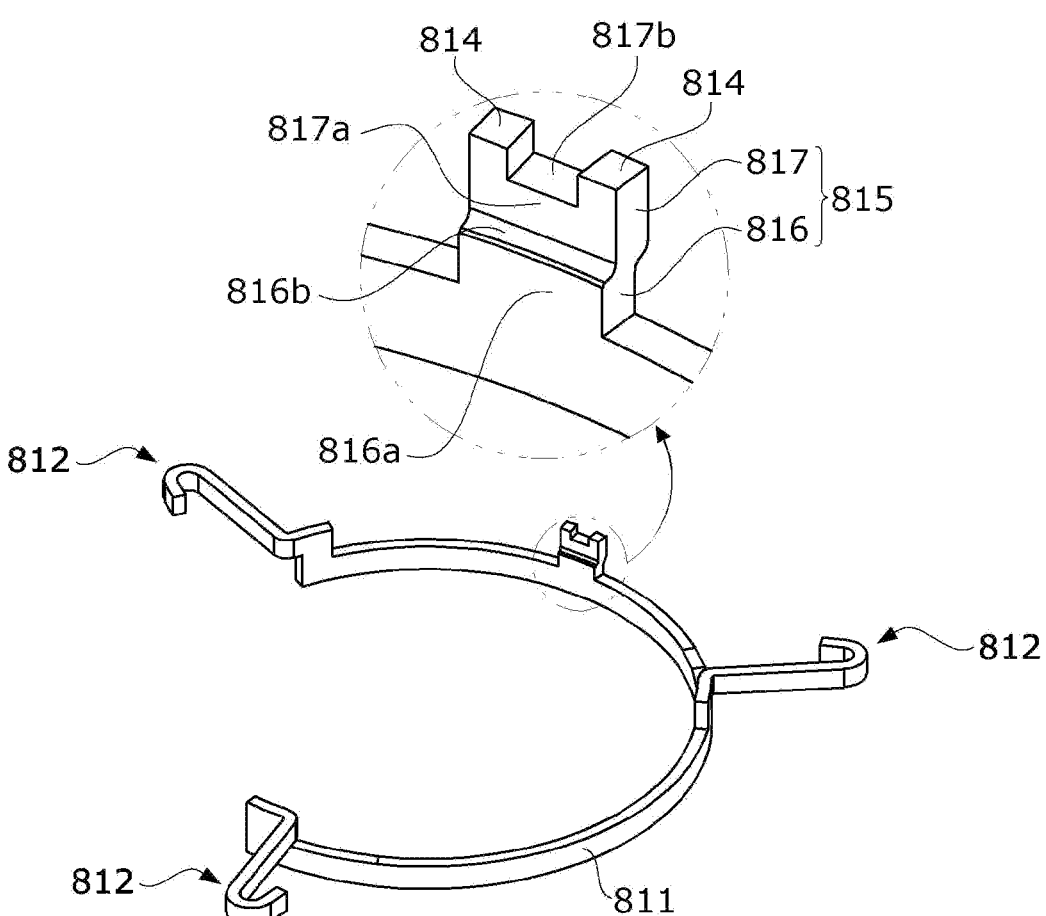

[FIG. 19]
<u>800b</u>
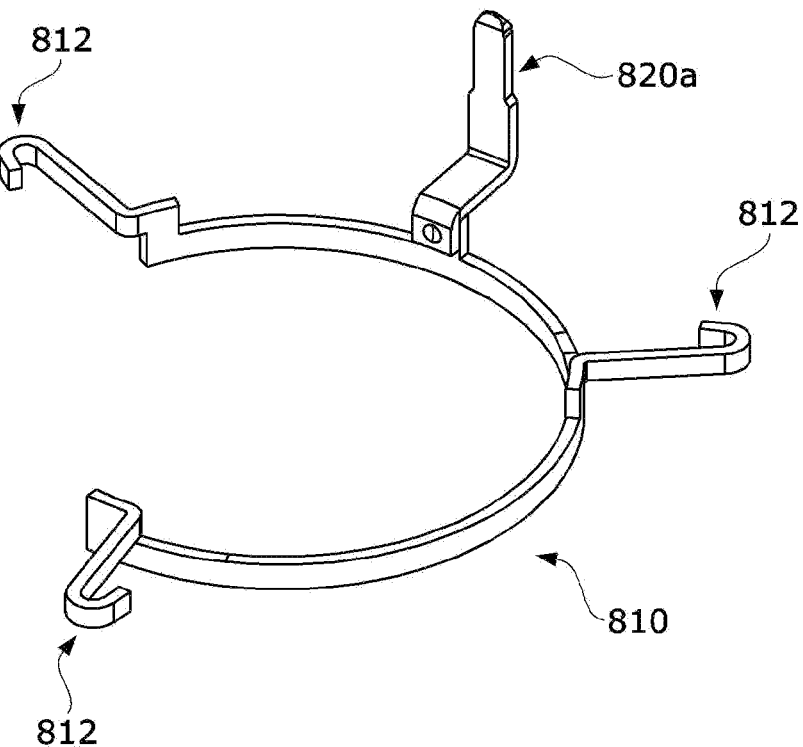

[FIG. 21]
<u>800b</u>
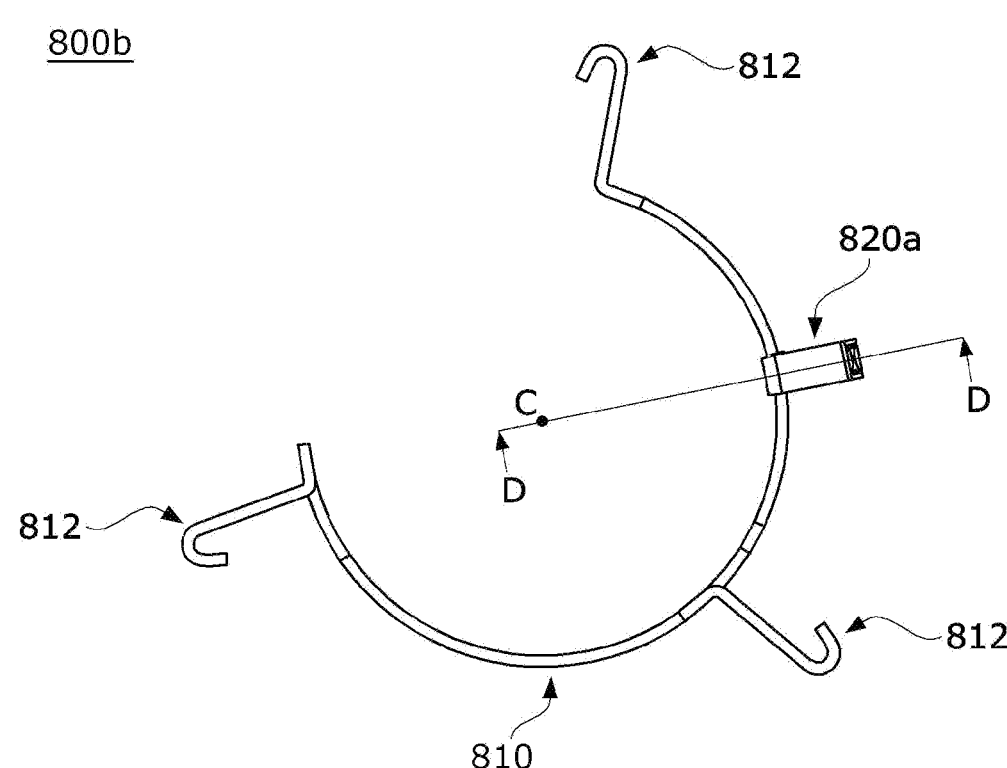

[FIG. 22]
<u>800b</u>
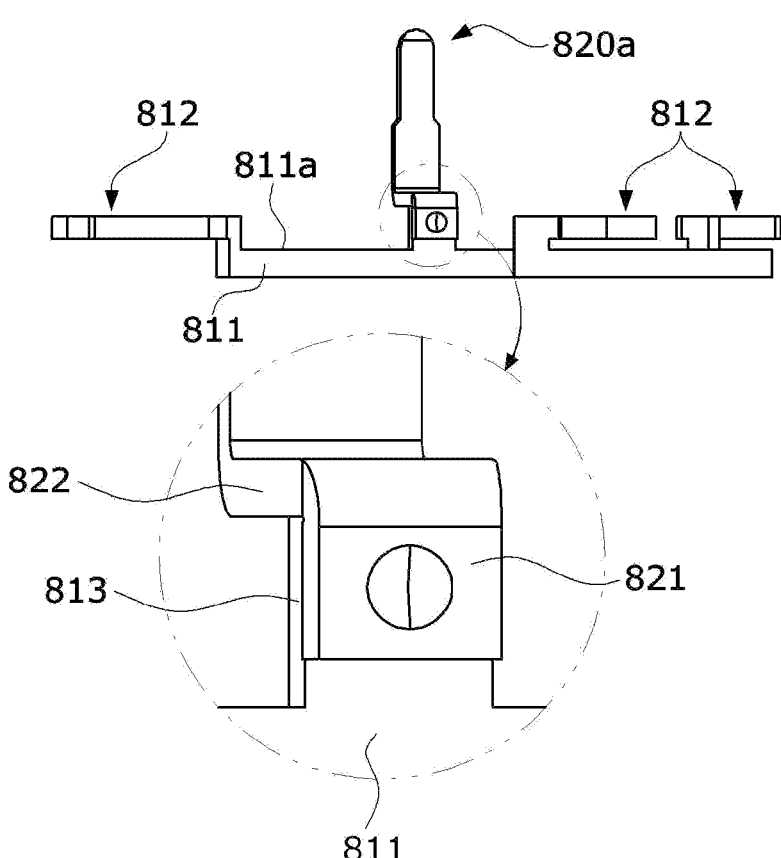

[FIG. 23]
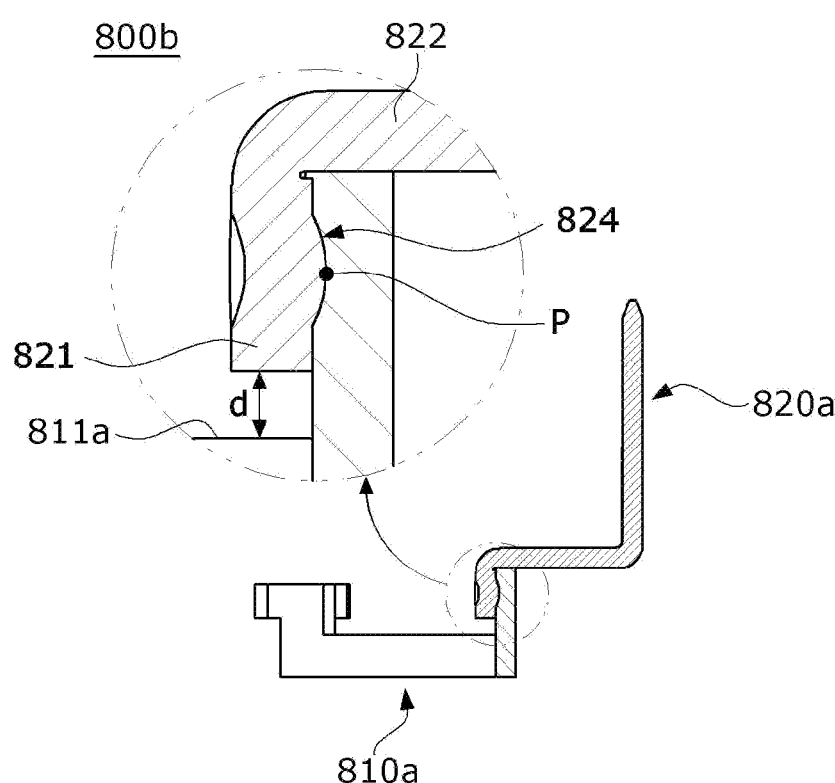

[FIG. 24]
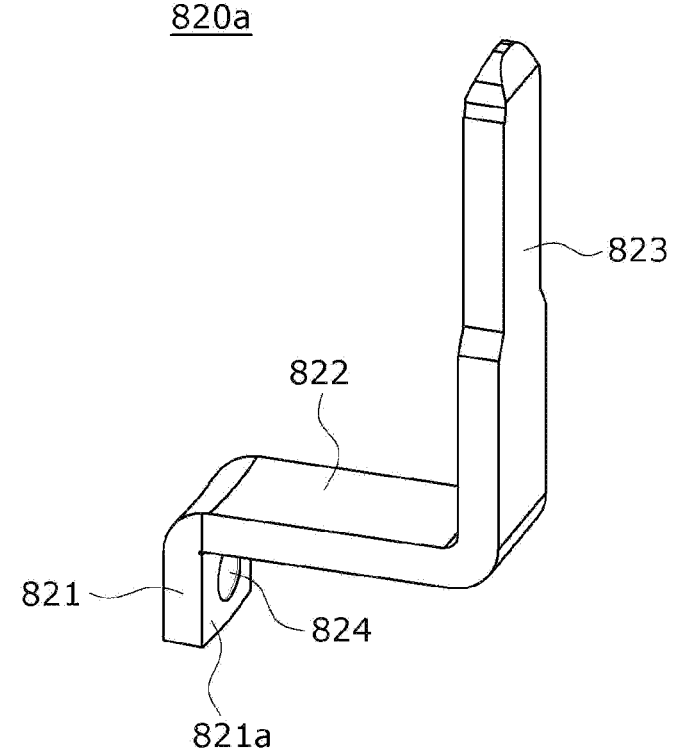
[FIG. 25]
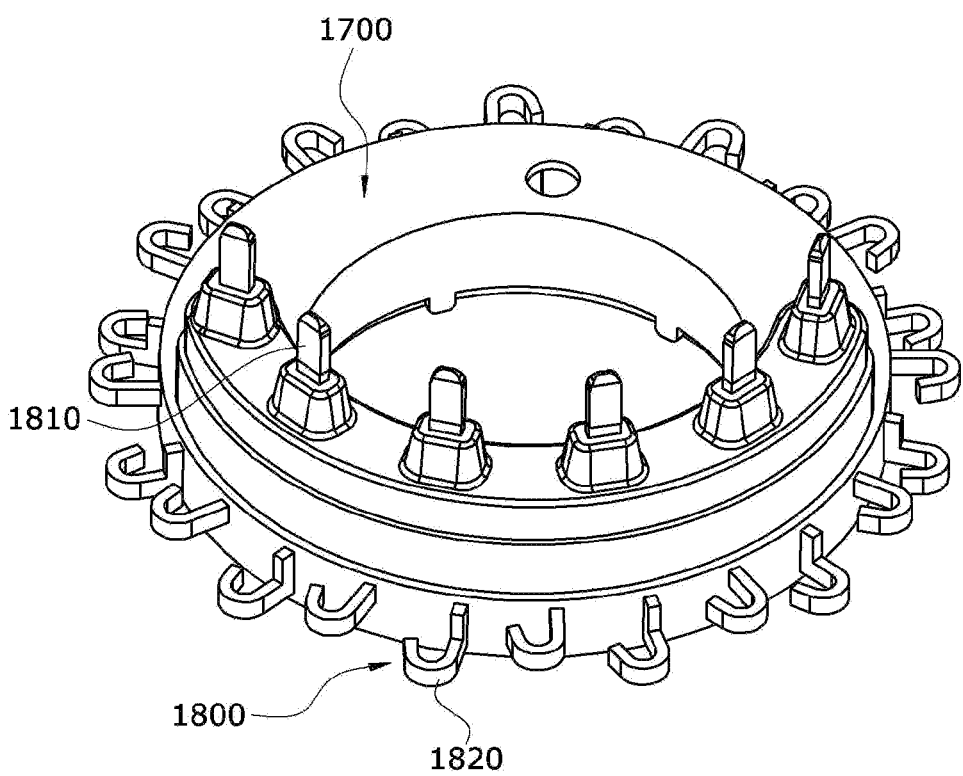

[FIG. 26]
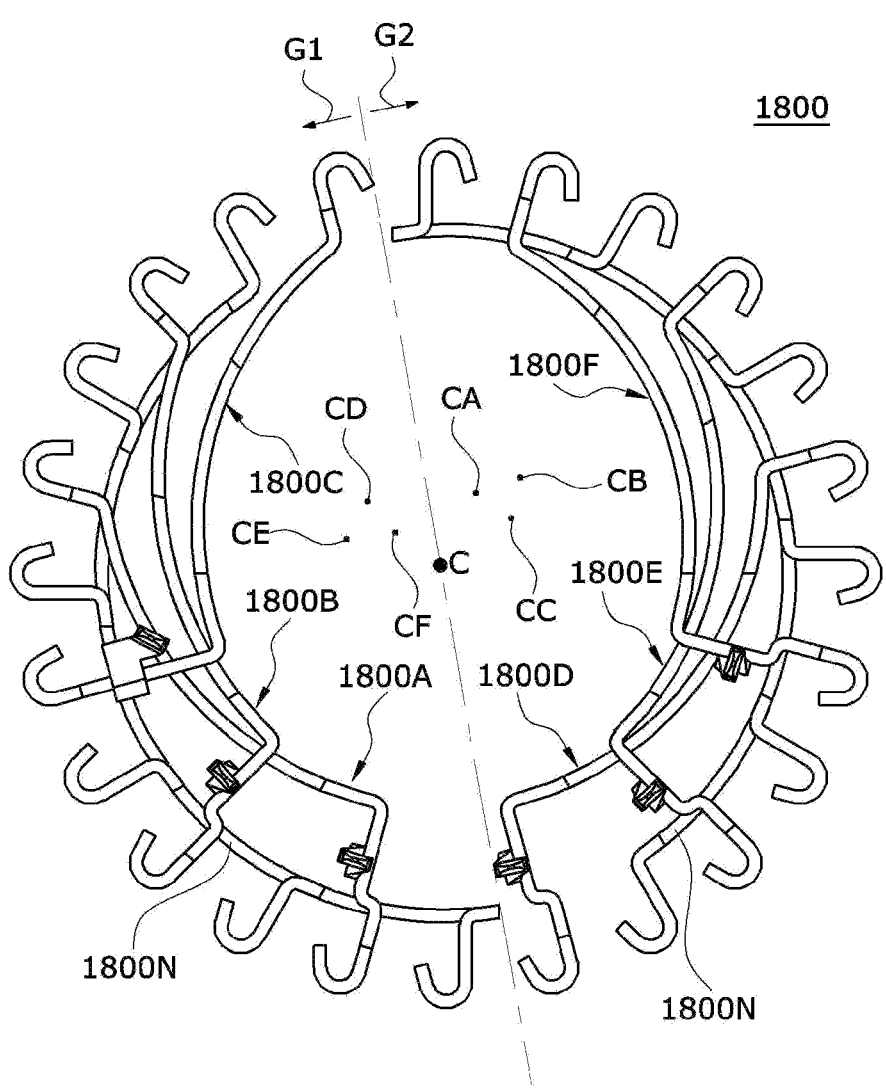

[FIG. 27]
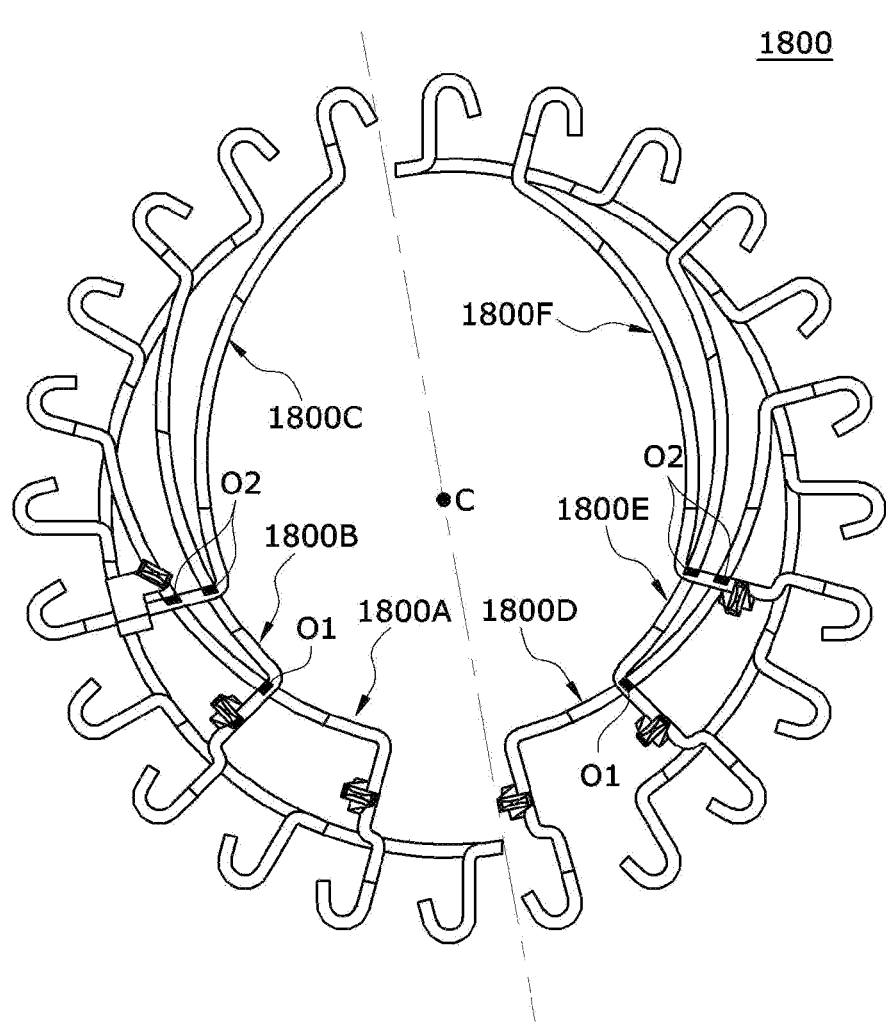

[FIG. 28]
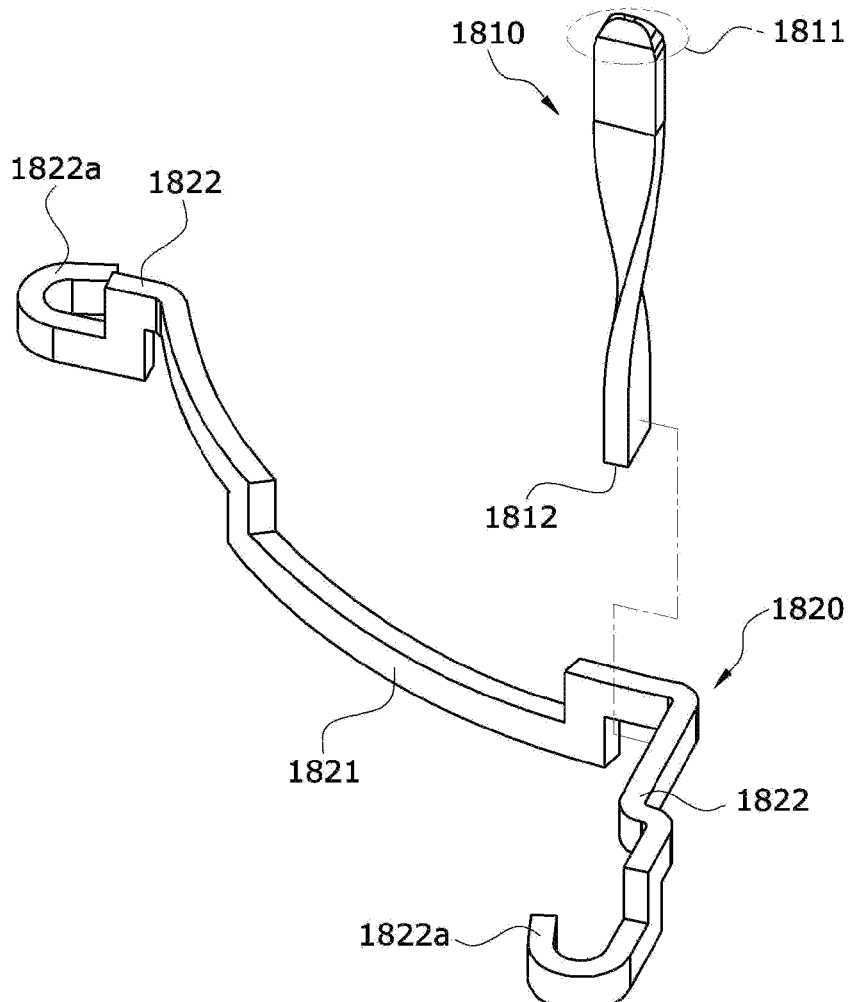

[FIG. 29]
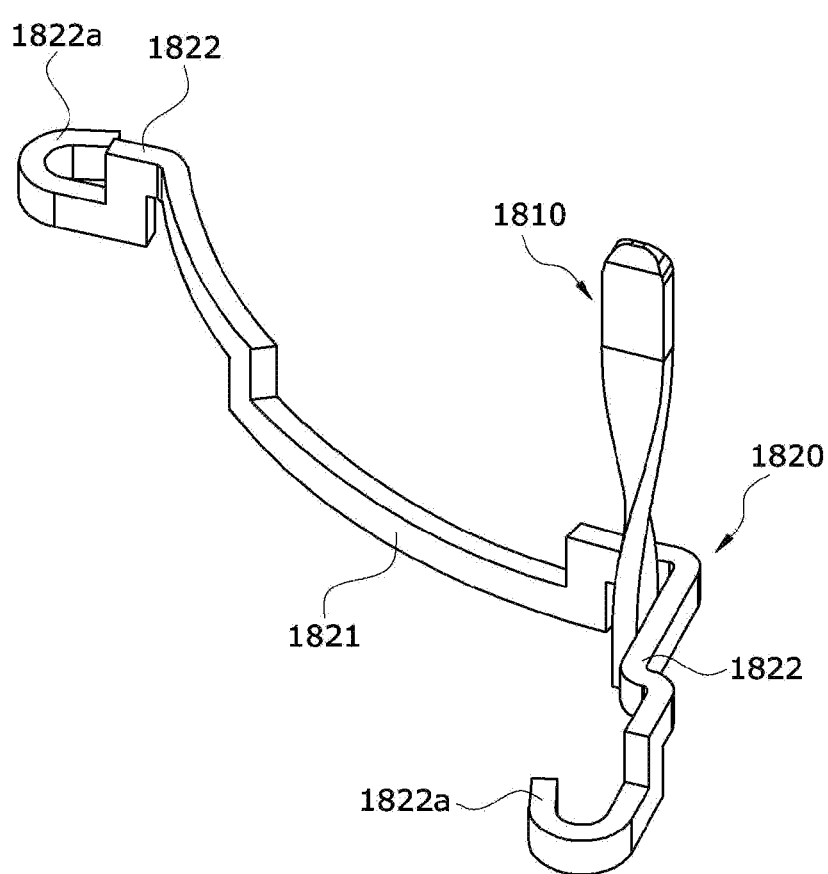

[FIG. 30]
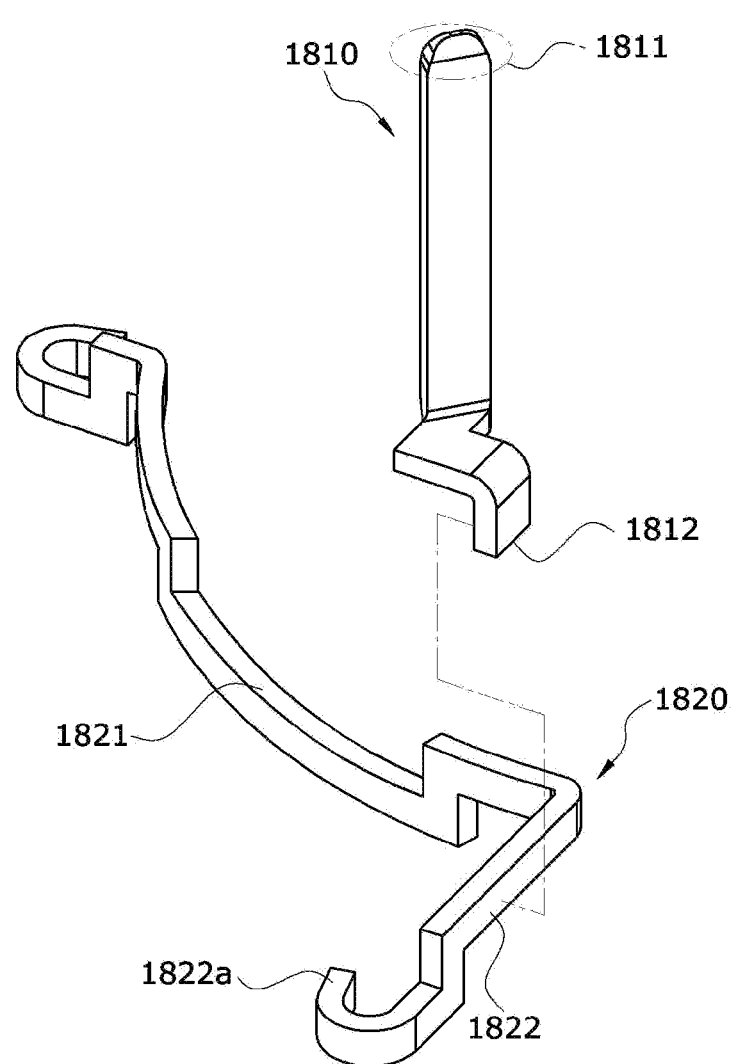

[FIG. 31]
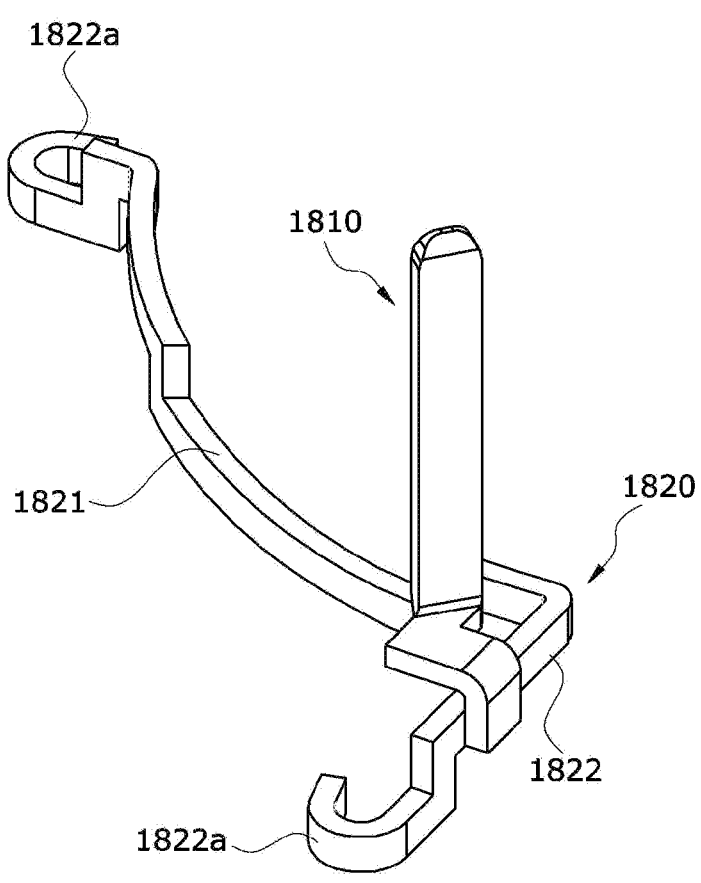
[FIG. 32]
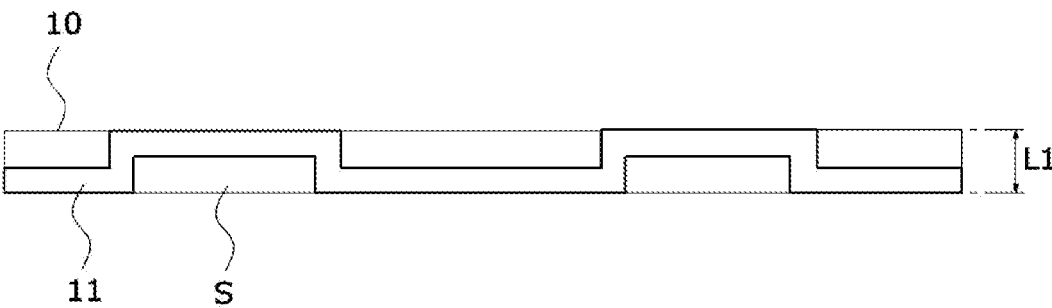
[FIG. 33]
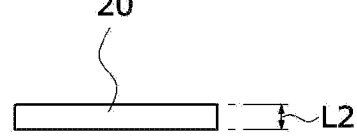

[FIG. 34]
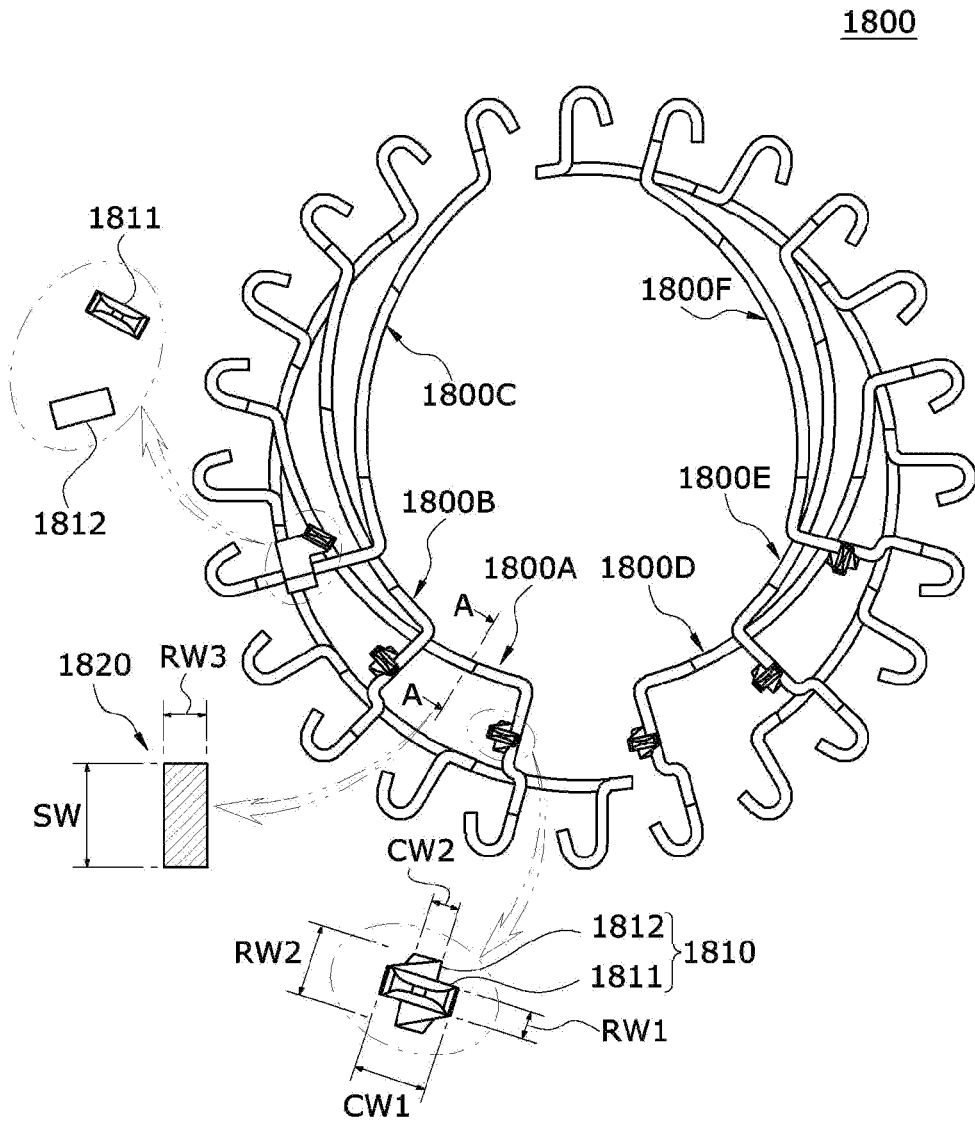

BUSBAR AND MOTOR COMPRISING SAME

CROSS-REFERENCE TO RELATED PATENT APPLICATIONS

This application is a U.S. National Stage Application under 35 U.S.C. § 371 of PCT Application No. PCT/KR2021/008254, filed Jun. 30, 2021, which claims priority to Korean Patent Application Nos. 10-2020-0081990, filed Jul. 3, 2020 and 10-2020-0149834, filed Nov. 11, 2020, whose entire disclosures are hereby incorporated by reference.

TECHNICAL FIELD

The embodiment relates to a busbar and a motor including the same.

BACKGROUND ART

A motor may include a busbar disposed on a stator. In this case, the busbar may include a busbar terminal coupled to an end portion of a coil disposed on the stator.

In a conventional busbar terminal, a finished busbar terminal may be formed through a method of providing a primary part formed by a primary process of cutting one plate member and bending the primary part. However, the conventional busbar terminal has a problem that many scraps are generated during the forming process of cutting one plate member.

In addition, one side of the conventional busbar terminal may be coupled to a component such as a connector for applying external power. Accordingly, there is a problem of increasing production costs by performing a plating process on the entire conventional busbar terminal. In addition, due to a complex structure of the conventional busbar terminal according to several times of bending processes, the plating process should be performed in a rack plating method, and thus there is a problem that the production costs are further increased.

Accordingly, there is a request for the development of a busbar terminal structure which can reduce plating costs while minimizing an amount of scraps.

DISCLOSURE

Technical Problem

An embodiment is directed to providing a busbar formed by minimizing generation of scraps using a busbar terminal implemented by coupling two members, and a motor including the same.

An embodiment is directed to providing a busbar having an embossing structure which increases a fixing force between two members when the two members constituting a busbar terminal are fused, and a motor including the same.

In addition, an embodiment is directed to providing a motor compatibly used at various connection positions of external power sources.

Technical Solution

One aspect of the present invention provides a motor including a stator, a rotor disposed to correspond with the stator, a shaft coupled to the rotor, and a busbar disposed above the stator, wherein the busbar includes a busbar body and a plurality of busbar terminals disposed on the busbar body, each of the busbar terminals includes a body part and a power terminal part coupled to the body part, the body part includes a body, a plurality of terminals disposed on the body, and a protrusion protruding from an upper surface of the body in an axial direction, and one lower surface of the power terminal part is in contact with an inner surface of the protrusion. In this case, a lower end of the power terminal part may be disposed to be spaced a predetermined distance (d) away from the upper surface of the body in the axial direction.

Another aspect of the present invention provides a busbar including a busbar body and a plurality of busbar terminals which are coupled through a fusing process, wherein each of the busbar terminals includes a body part and a power terminal part coupled to the body, the body part includes a body, a plurality of terminals disposed on the body, and a protrusion protruding from an upper surface of the body in an axial direction, and one lower surface of the power terminal part is in contact with an inner surface of the protrusion.

The power terminal part may include a first region disposed to be spaced the predetermined interval (d) away from the upper surface of the body, a second region extending from an end portion of the first region in a radial direction, and a third region extending from an end portion of the second region in the axial direction, wherein an outer surface of the first region may be in contact with the inner surface of the protrusion, and a lower surface of the second region may be in contact with an upper surface of the protrusion.

The power terminal part may include a first region disposed to be spaced the predetermined distance (d) away from the upper surface of the body, a second region extending from an end portion of the first region in a radial direction, a third region extending from an end portion of the second region in the axial direction, and an embossing protruding from an outer surface of the first region, wherein the embossing formed in a hemispherical shape may be in contact with the inner surface of the protrusion.

The protrusion may include a first protruding part formed to extend from the upper surface of the body in the axial direction and a second protruding part extending to be bent outward from an end portion of the first protruding part, the power terminal part may include a first region disposed to be spaced the predetermined distance (d) away from the upper surface of the body, a second region extending from an end portion of the first region in a radial direction, and a third region extending from an end portion of the second region in the axial direction, and an inner surface of the second protruding part may be in contact with an outer surface of the first region.

The protrusion may include a first protruding part formed to extend from the upper surface of the body in the axial direction and a second protruding part extending to be bent outward from an end portion of the first protruding part, the power terminal part may include a first region disposed to be spaced the predetermined distance (d) away from the upper surface of the body, a second region extending from an end portion of the first region in a radial direction, a third region extending from an end portion of the second region in the axial direction, and an embossing protruding from an outer surface of the first region, and the embossing formed in a hemispherical shape may be in point contact with an inner surface of the second protruding part.

Still another aspect of the present invention provides a motor including a shaft, a rotor coupled to the shaft, and a stator disposed to correspond with the rotor, wherein the stator includes a stator core and an insulator coupled to the stator core and coils disposed on the insulator, a busbar includes a plurality of busbar terminals electrically connected to the coils and a busbar holder which supports the busbar terminals, wherein each of the plurality of busbar terminals includes a first body and a second body coupled to the first body, and among at least some of the plurality of the busbar terminals, the first body is twisted and coupled to the second body, and among at least some of the plurality of the busbar terminals, curvature centers of the second bodies are different.

Advantageous Effects

A busbar and a motor including the same according to an embodiment can minimize an amount of scraps generated when a busbar terminal is formed because the busbar terminal is implemented to have a coupling structure of a body part and a power terminal part.

In addition, in an embodiment, since a plating process can be performed on the front of a power terminal part and a plurality of power terminal parts can be plated in a barrel plating manner, a plating cost can be minimized.

An embodiment has an advantage of providing a busbar terminal which is compatibly used at various connection positions of external power sources.

An embodiment has an advantage of simplifying a manufacturing process by removing a bending process of a busbar terminal.

DESCRIPTION OF DRAWINGS

FIG. 1 is a view illustrating a motor according to an embodiment.

FIG. 2 is a cross-sectional view illustrating the motor according to the embodiment.

FIG. 3 is a perspective view illustrating a busbar of a motor according to a first embodiment.

FIG. 4 is a perspective view illustrating a plurality of busbar terminals of the busbar disposed in the motor according to the first embodiment.

FIG. 5 is a plan view illustrating the plurality of busbar terminals of the busbar disposed in the motor according to the first embodiment.

FIG. 6 is a development view illustrating a body part of the busbar terminal disposed in the motor according to the first embodiment.

FIG. 7 is a perspective view illustrating a first example of the busbar terminal disposed in the motor according to the first embodiment.

FIG. 8 is an exploded perspective view illustrating the first example of the busbar terminal disposed in the motor according to the first embodiment.

FIG. 9 is a plan view illustrating the first example of the busbar terminal disposed in the motor according to the first embodiment.

FIG. 10 is a side view illustrating the first example of the busbar terminal disposed in the motor according to the first embodiment.

FIG. 11 is a cross-sectional view along line B-B of FIG. 9.

FIG. 12 is a view illustrating a modified example of the body part of the busbar terminal according to the first example disposed in the motor according to the first embodiment.

FIG. 13 is a perspective view illustrating a second example of the busbar terminal disposed in the motor according to the first embodiment.

FIG. 14 is an exploded perspective view illustrating the second example of the busbar terminal disposed in the motor according to the first embodiment.

FIG. 15 is a plan view illustrating the second example of the busbar terminal disposed in the motor according to the first embodiment.

FIG. 16 is a side view illustrating the second example of the busbar terminal disposed in the motor according to the first embodiment.

FIG. 17 is a cross-sectional view along line C-C of FIG. 15.

FIG. 18 is a view illustrating a modified example of the body part of the busbar terminal according to the second example disposed in the motor according to the first embodiment.

FIG. 19 is a perspective view illustrating a third example of the busbar terminal disposed in the motor according to the first embodiment.

FIG. 20 is an exploded perspective view illustrating the third example of the busbar terminal disposed in the motor according to the first embodiment.

FIG. 21 is a plan view illustrating the third example of the busbar terminal disposed in the motor according to the first embodiment.

FIG. 22 is a side view illustrating the third example of the busbar terminal disposed in the motor according to the first embodiment.

FIG. 23 is a cross-sectional view along line D-D of FIG. 21.

FIG. 24 is a view illustrating a power terminal part of the busbar terminal according to the third example disposed in the motor according to the first embodiment.

FIG. 25 is a view illustrating a busbar terminal and a busbar holder of a motor according to a second embodiment.

FIG. 26 is a plan view illustrating the busbar terminal of the motor according to the second embodiment.

FIG. 27 is a plan view illustrating a busbar having an overlap region of busbar terminals of the motor according to the second embodiment.

FIG. 28 is an exploded view illustrating the busbar terminal illustrated in FIG. 26.

FIG. 29 is a perspective view illustrating the assembled busbar terminal.

FIG. 30 is a view illustrating the busbar terminal including a first body having a bent shape.

FIG. 31 is a perspective view illustrating an assembled busbar terminal which is the busbar terminal of FIG. 30.

FIG. 32 is a development view illustrating a plate member forming a second body of the busbar terminal.

FIG. 33 is a development view illustrating a plate member forming a first body of the busbar terminal.

FIG. 34 is an enlarged plan view illustrating a cross-sectional shape of the busbar terminal.

MODES OF THE INVENTION

Hereinafter, exemplary embodiments of the present invention will be described in detail with reference the accompanying drawings. However, the technical spirit of the present invention is not limited to some embodiments which will be described and may be embodied in a variety of different forms, and at least one or more components of the embodiments may be selectively combined, substituted, and used.

In addition, when any one element is described as being formed or disposed "on" or "under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

Hereinafter, in the detailed description of the example embodiments of the invention with reference to the accompanying drawings, components that are the same or correspond to each other will be denoted by the same reference numerals in all of the figures, and redundant descriptions will be omitted.

First Embodiment

FIG. 1 is a view illustrating a motor according to a first embodiment, and FIG. 2 is a cross-sectional view illustrating the motor according to the first embodiment. In this case, FIG. 2 is the cross-sectional view along line A-A of FIG. 1. In addition, in FIG. 1, an x direction may denote a radial direction, and a y direction may denote an axial direction. In addition, the axial direction and the radial direction may be perpendicular to each other. In this case, the axial direction may be a longitudinal direction of a shaft 500.

Referring to FIGS. 1 and 2, the motor according to the first embodiment may include a housing 100 having an opening formed at one side thereof, a cover 200 disposed on the housing 100, a stator 300 disposed inside the housing 100, a rotor 400 disposed inside the stator 300, and a shaft 500 coupled to the rotor 400. In this case, the term "inward" may refer to a direction toward a rotary center C of the motor in the radial direction, and the term "outward" may refer to a direction opposite to "inward."

In addition, the motor may include a busbar 600 disposed above the stator 300 and a sensor part 900 which detects rotation of the rotor 400.

The housing 100 and the cover 200 may form an exterior of the motor. In addition, the housing 100 and the cover 200 may be coupled to form an accommodation space therein. Accordingly, as illustrated in FIG. 2, the stator 300, the rotor 400, the shaft 500, the busbar 600, the sensor part 900, and the like may be disposed in the accommodation space.

In this case, the shaft 500 is rotatably disposed in the accommodation space. Accordingly, the motor may further include bearings B disposed on upper and lower portions of the shaft 500. In this case, the bearing B disposed in the housing 100 may be referred to as a first bearing or lower bearing, and the bearing B disposed in the cover 200 may be referred to as a second bearing or upper bearing.

The housing 100 may be formed in a cylindrical shape. The housing 100 may accommodate the stator 300, the rotor 400, and the like therein. In this case, the shape or material of the housing 100 may be variously changed. For example, the housing 100 may be formed of a metal material which can endure well even at high temperatures.

The housing 100 may include a pocket part capable of accommodating the bearing B in a lower portion thereof. In this case, the pocket part of the housing 100 may be referred to as a housing pocket part.

The cover 200 may be disposed on an open surface of the housing 100, that is, on the housing 100, to cover an opening of the housing 100.

The cover 200 may include a pocket part capable of accommodating the bearing B. In this case, the pocket part of the cover 200 may be referred to as a cover pocket part.

The stator 300 induces an electrical interaction with the rotor 400 to induce rotation of the rotor 400.

The stator 300 may be disposed inside the housing 100. In this case, the stator 300 may be supported by an inner circumferential surface of the housing 100. In addition, the stator 300 may be disposed outside the rotor 400. That is, the rotor 400 may be rotatably disposed inside the stator 300.

Referring to FIGS. 1 and 2, the stator 300 may include a stator core 310, an insulator 320 disposed on the stator core 310, and coils 330 wound around the insulator 320.

The coils 330 which generate a rotating magnetic field may be wound around the stator core 310. In this case, the stator core 310 may be formed as one core or formed by coupling a plurality of divided cores.

The stator core 310 may be formed in a shape in which a plurality of thin steel plates are stacked on each other but is not necessarily limited thereto. For example, the stator core 310 may be formed as a single part.

The stator core 310 may include a yoke 311, a plurality of teeth 312, and shoes 313 formed on inner end portions of the teeth 312. In this case, an inner surface of each of the shoes 313 may be formed parallel to a virtual line disposed perpendicular to the radial direction when viewed from above.

The yoke 311 may be formed in a cylindrical shape. Accordingly, the yoke 311 may include a cross section having a ring shape when viewed from above.

The plurality of teeth 312 may be disposed to be spaced apart from each other in a circumferential direction of the yoke 311. Accordingly, slots, which are spaces in which the coils 330 are wound, may be formed between the teeth 312.

The shoe 313 may extend to protrude inward from the inner end portion of the tooth 312. In this case, a width of the shoe 313 may be greater than a width of the tooth 312.

The shoe 313 may be disposed opposite to a magnet 420 of the rotor 400. In this case, the shoe 313 may be disposed to be spaced a predetermined distance from an outer circumferential surface of the magnet 420 in the radial direction. In this case, the distance may be referred to as an air gap and may be a distance between the shoe 313 and the magnet 420 in the radial direction.

The insulator 320 insulates the stator core 310 from the coils 330. Accordingly, the insulator 320 may be disposed between the stator core 310 and the coils 330.

Accordingly, the coils 330 may be wound around the stator core 310 on which the insulator 320 is disposed.

The rotor 400 rotates due to an electrical interaction with the stator 300. In this case, the rotor 400 may be rotatably disposed with respect to the stator 300.

The rotor 400 may include a rotor core 410 and a plurality of magnets 420 disposed outside the rotor core 410. In addition, the rotor 400 may include a can disposed outside the rotor core 410, to which the magnets 420 are coupled, to prevent the magnets 420 from being separated and to increase a coupling force. In this case, the magnets 420 may be disposed on the rotor core 410 to be spaced a predetermined interval from each other in a circumferential direction with respect to the center C.

The rotor core 410 may be formed in a shape in which a plurality of thin steel plates are stacked or in a shape of one barrel.

In addition, a hole to which the shaft 500 is coupled may be formed at the center C of the rotor core 410.

The magnets 420 and the coils 330 wound around the stator core 310 of the stator 300 generate a rotating magnetic field.

Accordingly, the rotor 400 is rotated by the electrical interaction between the coils 330 and the magnets 420, and the shaft 500 is rotated in conjunction with the rotation of the rotor 400 to generate a driving force of the motor.

In this case, the magnets 420 may be disposed outside the rotor core 410 to implement a surface permanent magnet (SPM) type rotor.

The can may protect the rotor core 410 and the magnets 420 from physical or chemical stimuli. In addition, the can may prevent the magnets 420 from being separated from the rotor core 410. In this case, the can may be disposed to cover the magnets 420 disposed on the rotor core 410.

The shaft 500 may be disposed inside the housing 100 to be rotatable by the bearing B. The shaft 500 may rotate in conjunction with the rotation of the rotor 400.

The shaft 500 may be coupled to the hole formed at the center of the rotor core 410 in a press-fit manner.

The busbar 600 may be disposed on the stator 300 as illustrated in FIG. 2. The busbar 600 may be electrically connected to the coils 330 of the stator 300.

FIG. 3 is a perspective view illustrating the busbar of the motor according to the first embodiment, FIG. 4 is a perspective view illustrating a plurality of busbar terminals of the busbar disposed in the motor according to the first embodiment. FIG. 5 is a plan view illustrating the plurality of busbar terminals of the busbar disposed in the motor according to the first embodiment, and FIG. 6 is a development view illustrating a body part of the busbar terminal disposed in the motor according to the first embodiment.

Referring to FIGS. 3 to 5, the busbar 600 may include a busbar body 700 formed of an insulating material and a plurality of busbar terminals 800 disposed on the busbar body 700.

The busbar body 700 may be a mold part formed by injection molding. Accordingly, the busbar body 700 may be injection-molded to form the busbar 600 in a state in which the plurality of busbar terminals 800 are disposed to be spaced a predetermined gap G from each other in the radial direction.

The plurality of busbar terminals 800 may be disposed to be spaced apart from each other in the radial direction. In addition, each of the busbar terminals 800 may be electrically connected to the coils 330 of the stator 300.

The busbar terminal 800 may be formed by coupling two separate members. That is, the busbar terminal 800 may be formed by coupling a body part 810 and a power terminal part 820. In this case, the body part 810 and the power terminal part 820 may be coupled by fusing.

Accordingly, since the busbar terminal 800 according to the embodiment is formed by cutting only the body part 810 instead of cutting the body part and the power terminal part integrally formed on one plate member at once like the conventional busbar terminal, an amount of scraps discarded by cutting due to a structure thereof can be minimized.

That is, in the busbar terminal 800 according to the embodiment, only the body part 810 is formed from one plate member having a predetermined thickness, the amount of scraps discarded by cutting can be minimized. For example, as illustrated in FIG. 6, since the body part 810 is formed to have a predetermined width W1, a primary part may be formed by a primary process of cutting only a region of one plate member corresponding to the body part 810. As a result, the amount of scraps discarded by cutting can be minimized. In addition, the primary part may be bent to form the body part 810 of the busbar terminal 800 disposed on the busbar 600.

In addition, since the busbar terminal 800 is formed by coupling the body part 810 and power terminal part 820 which are separated into two members, a plating process may be performed on each of the body part 810 and the power terminal part 820.

In the conventional busbar terminal, the plating process is performed in a rack plating method due to the complex structure thereof. Accordingly, there is a problem of increasing production costs. In this case, the rack plating method may be a method of hanging a plating target body on a fixture or hanger and plating the plating target body.

However, in the busbar terminal 800, since the body part 810 and the power terminal part 820 are formed as the separate members, the body part 810 may be formed by cutting and bending a plate-shaped pre-plated part. Accordingly, a plating layer may be formed on a partial surface of the body part 810, and a plating layer may not be formed on a cut surface. For example, since the body part 810 is formed by cutting a pre-plated plate-shaped part, the plating layer may not be formed on the partial surface. That is, since the body part 810 is formed by molding the pre-plated plate member, the body part 810 may include a non-plated surface on which plating is not performed. In this case, the non-plated surface may be the cut surface formed through a cutting process of the body part 810.

In addition, in the power terminal part 820, a plate-shaped part may be cut and bent, and a plating process may be separately performed through a post-plating manner. In this case, in the power terminal part 820, the plating process may be performed through a barrel plating method of which a cost is low and in which a plurality of pieces may be plated at once.

Accordingly, in the busbar terminal 800, the plating may be performed on an entire surface of only the power terminal part 820 to be coupled to a connector through which external power is applied, and thus costs can be reduced, that is, a plating layer may be formed on the entire surface of the power terminal part 820. In addition, since the plating process is performed on a plurality of power terminal parts 820 through the barrel plating method, the cost can be further reduced. In this case, the barrel plating method may be a method of plating after a large number of plating target objects are placed in a barrel.

Referring to FIG. 5, the plurality of busbar terminals 800 may be disposed to be spaced the predetermined gap G from each other in the radial direction. Specifically, body parts 810 of the plurality of busbar terminals 800 may be disposed to be spaced the predetermined gap G from each other in the radial direction. In this case, a partial inner part of the power terminal part 820 may be disposed overlap the gap G in the axial direction. However, the power terminal parts 820 may be coupled to the body parts 810 to be spaced apart from each other in the axial direction so that the plurality of busbar terminals 800 are physically and electrically separated from each other.

As illustrated in FIG. 5, an inner end portion of the power terminal part 820 of any one busbar terminal 800 disposed outward in the radial direction may be disposed to overlap the body part 810 of another busbar terminal 800, which is disposed therein in the axial direction.

For example, a first busbar terminal, a second busbar terminal, and a third busbar terminal may be disposed to be spaced apart from each other in the radial direction with respect to the center C. In addition, the inner end portion of the power terminal part of the second busbar terminal may be disposed to overlap the body part of the first busbar terminal in the axial direction. However, as in the case of a busbar terminal according to a second embodiment described below, a thickness may be reduced as a protrusion formed in the body part of the second busbar terminal is bent outward by a pressing process. In this case, the body part of the first busbar terminal and the inner end portion of the power terminal part of the second busbar terminal may not overlap in the axial direction.

Busbar Terminal According to First Example

Figure 7:
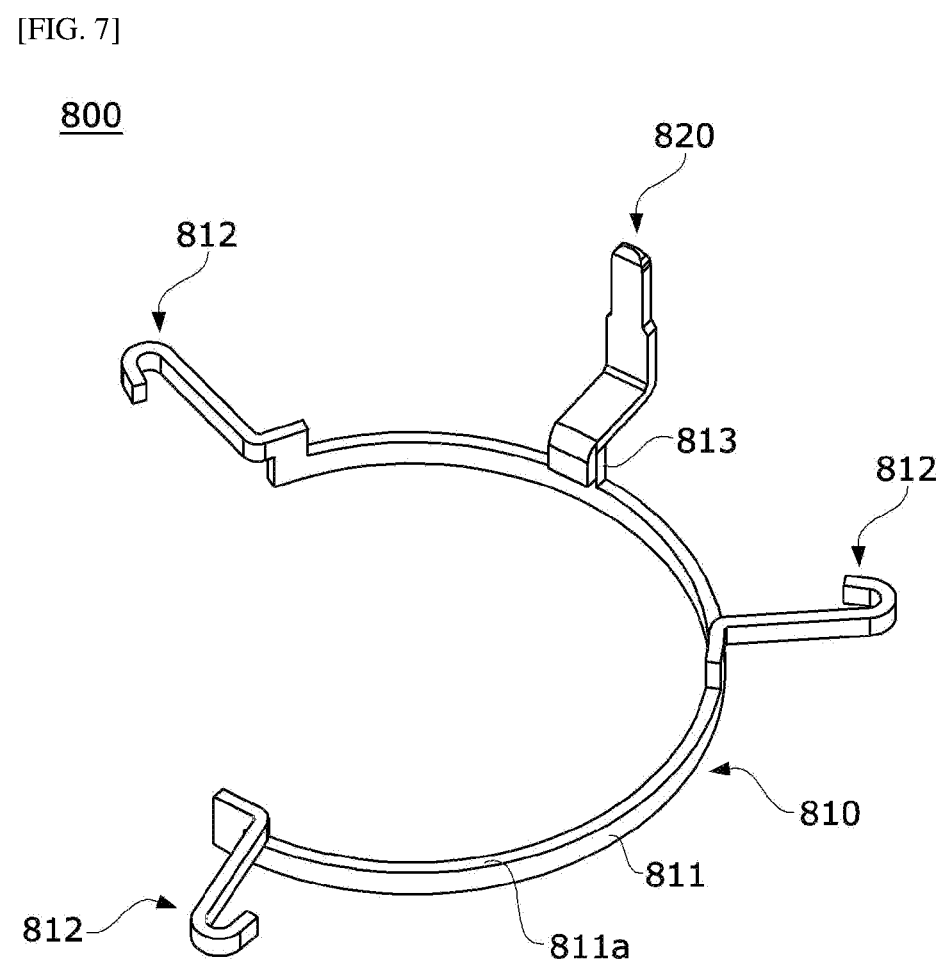
Figure 8:
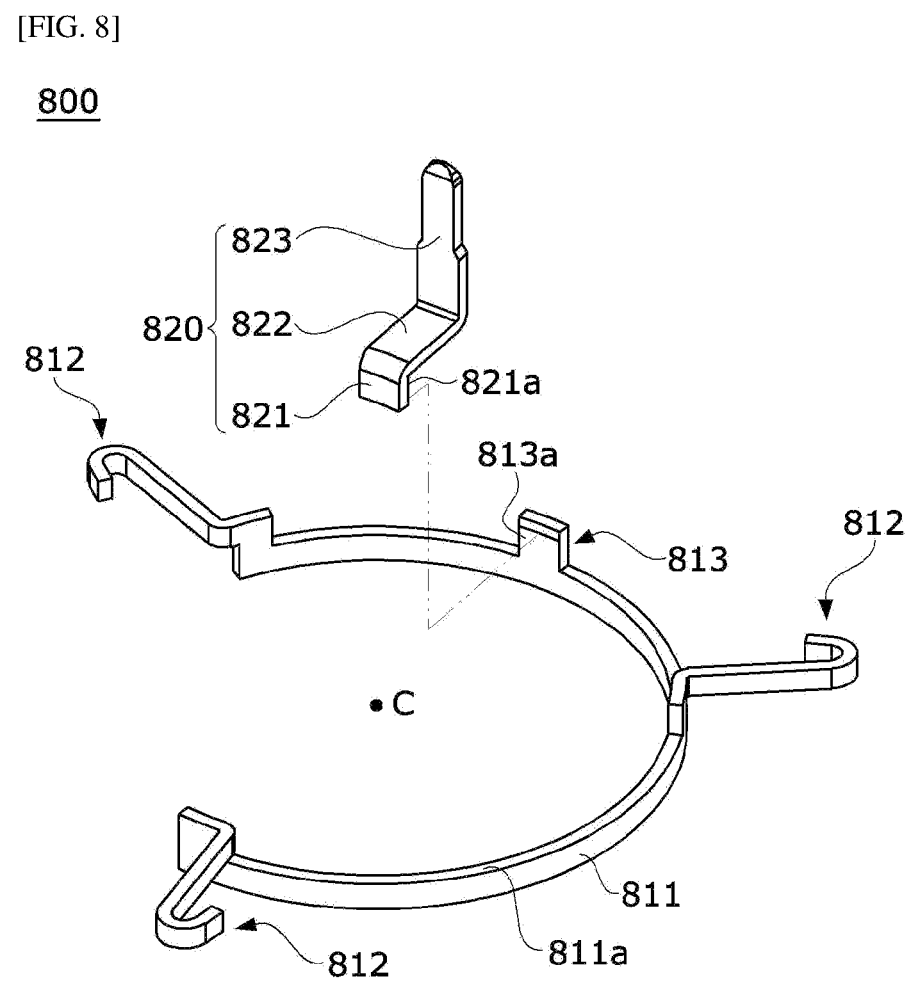
Figure 10:
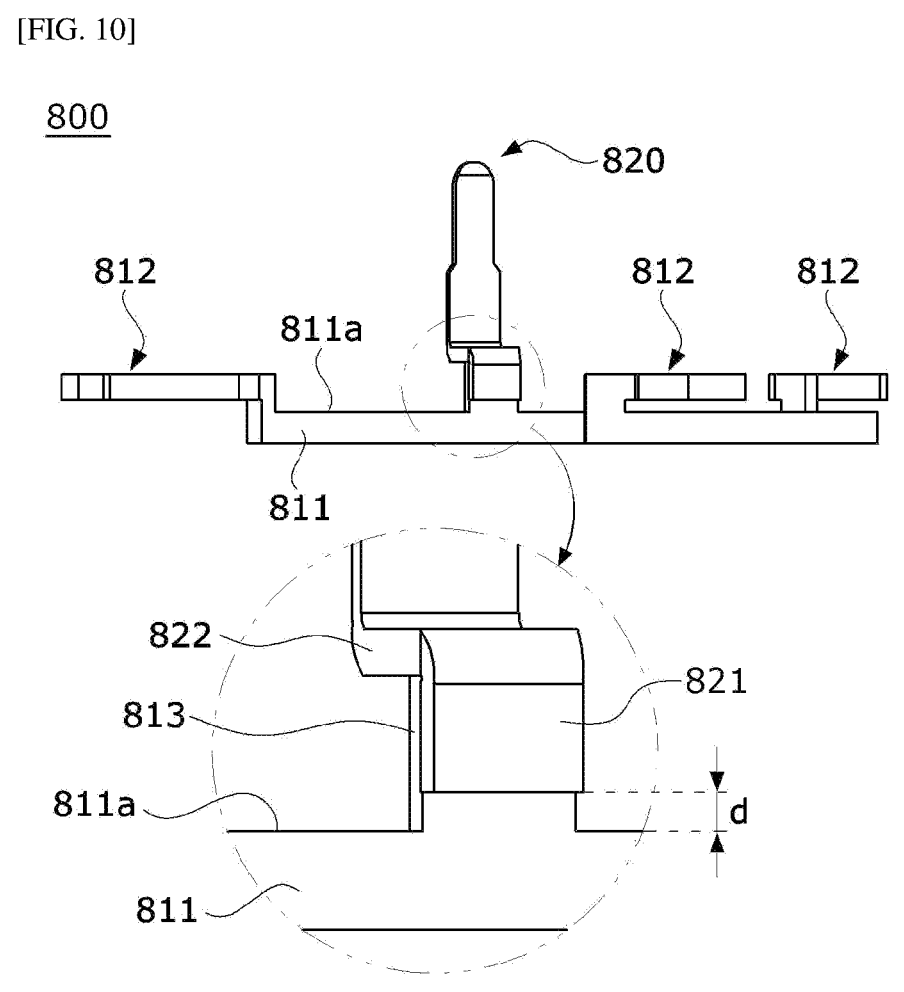

FIG. 7 is a perspective view illustrating a first example of the busbar terminal disposed in the motor according to the first embodiment, FIG. 8 is an exploded perspective view illustrating the first example of the busbar terminal disposed in the motor according to the first embodiment. FIG. 9 is a plan view illustrating the first example of the busbar terminal disposed in the motor according to the first embodiment, FIG. 10 is a side view illustrating the first example of the busbar terminal disposed in the motor according to the first embodiment, and FIG. 11 is a cross-sectional view along line B-B of FIG. 9.

Referring to FIGS. 7 to 11, a busbar terminal 800 includes a body part 810 electrically connected to end portions of coils 330 and a power terminal part 820 coupled to the body part 810. In this case, the power terminal part 820 may be electrically connected to a connector (not shown) provided for applying external power. Accordingly, one side of the power terminal part 820 may pass through a cover 200 and exposed to the outside.

The body part 810 may include a body 811, terminals 812 coupled to the coils 330, and a protrusion 813 protruding from an upper surface 811a of the body 811 in an axial direction. In this case, the body part 810 may be formed by cutting and bending a plate-shaped part. Accordingly, the body 811, the terminals 812, and the protrusion 813 may be integrally formed. The protrusion 813 may be referred to as a first protruding part.

The body 811 may be formed in an arc shape having a predetermined curvature when viewed in the axial direction. In this case, one surface of the body 811 may be formed as a curved surface having a predetermined curvature.

The terminals 812 may be formed as a plurality of terminals 812 on the body 811. As illustrated in FIG. 1, three terminals 812 may be disposed at equal intervals in a circumferential direction with respect to a center C.

In this case, the terminals 812 may be formed in a hook shape to be fused to the end portions of the coils 330. In this case, each of the terminals 812 may be formed to protrude from the upper surface 811a of the body 811 in a radial direction.

The protrusion 813 may be formed to extend from the upper surface 811a of the body 811 in the axial direction and may be in contact with one side of the power terminal part 820. As illustrated in FIG. 9, a partial region of an inner surface 813a of the protrusion 813 may be in contact with the protrusion 813. In this case, the partial region of the inner surface 813a of the protrusion 813 in contact with one side of the power terminal part 820 may be referred to as a contact surface or fusing surface. In addition, in consideration of rigidity and process stability of fusing, the contact surface may be at least 1.5 times a thickness t of the body 811 in the radial direction.

The power terminal part 820 may be formed by bending a plate-shaped part. In this case, one side of the power terminal part 820 may be disposed in contact with the protrusion 813, and a component (not shown), such as a connector through which external power is applied, may be coupled to the other side thereof. Accordingly, the power transmitted through the protrusion 813 may be transmitted to the coil 330 through the terminal 812.

Referring to FIGS. 8 and 11, the power terminal part 820 may include a first region 821 of which one side is in contact with the protrusion 813, a second region 822 extending in the radial direction from an end portion of the first region 821, and a third region 823 extending in the axial direction from an end portion of the second region 822.

The first region 821 may be formed in a plate shape disposed in the axial direction in consideration of an amount of contact with the protrusion 813 protruding from the body 811 in the axial direction. Accordingly, an outer surface 821a of the first region 821 may be in contact with a partial region of the inner surface 813a of the protrusion 813. In addition, the first region 821 and the protrusion 813 may be coupled through a fusing process. In this case, the first region 821 may be referred to as a lower end portion of the power terminal part 820.

Referring to FIG. 11, a lower end of the first region 821 may be disposed to be spaced a predetermined distance d from the upper surface 811a of the body 811 in the axial direction. Accordingly, any one power terminal part 820 among the plurality of busbar terminals 800 may be prevented from being in contact with another body part 810.

The second region 822 may be disposed to extend from the end portion of the first region 821 in the radial direction.

A lower surface of the second region 822 may be in contact with an upper surface of the protrusion 813. Accordingly, the protrusion 813 may support the second region 822, and thus an amount of contact between the body part 810 and the power terminal part 820 can be increased.

In this case, an example that the lower surface of the second region 822 is in contact with the upper surface of the protrusion 813 is described, but the present invention is not necessarily limited thereto. For example, the lower surface of the second region 822 may be disposed to be spaced apart from the upper surface of the protrusion 813, and in this case, a part of a busbar body 700 may be disposed between the upper surface of the protrusion 813 and the second region 822. However, since the busbar body 700 is not formed yet during the fusing process, there is a possibility that the body part 810 and the power terminal part 820 may move relatively. Accordingly, it is preferable that the upper surface of the protrusion 813 and the lower surface of the second region 822 be disposed in contact with each other.

The third region 823 may be disposed to extend from an outer end portion of the second region 822 in the axial direction. In addition, a component such as a connector through which external power is applied for applying power may be coupled to the third region 823. In this case, the first region 821 may be referred to as an upper end portion of the power terminal part 820.

FIG. 12 is a view illustrating a modified example of the body part of the busbar terminal according to the first example disposed in the motor according to the first embodiment.

Referring to FIG. 12, a body part 810 may further include guides 814 which guide a power terminal part 820. In this case, the guides 814 prevent the power terminal part 820 from being moved during a fusing process to improve accuracy of a coupling position of the body part 810 and the power terminal part 820.

The guides 814 may be provided as two protrusions disposed to be spaced apart from each other on an upper surface of a protrusion 813 in a circumferential direction. Accordingly, the guides 814 may be referred to as guide protrusions.

Each of the guide protrusions may be formed to protrude in an axial direction from the upper surface of the protrusion 813. The guide protrusion may be disposed to face a side surface of a second region 822 in the circumferential direction.

Busbar Terminal According to Second Example

FIG. 13 is a perspective view illustrating a second example of the busbar terminal disposed in the motor according to the first embodiment, and FIG. 14 is an exploded perspective view illustrating the second example of the busbar terminal disposed in the motor according to the first embodiment. FIG. 15 is a plan view illustrating the second example of the busbar terminal disposed in the motor according to the first embodiment, and FIG. 16 is a side view illustrating the second example of the busbar terminal disposed in the motor according to the first embodiment. FIG. 17 is a cross-sectional view along line C-C of FIG. 15.

In describing a busbar terminal 800a according to the second example with reference to FIGS. 13 to 17, since the same components as those of the busbar terminal 800 according to the first example may be assigned to the same numerals, detailed descriptions thereof will be omitted.

When the busbar terminal 800 according to the first example and the busbar terminal 800a according to the second example are compared, there is a difference in shape between protrusions coupled to power terminal parts 820. For example, in consideration of robustness of coupling and a contact possibility between busbar terminals, the busbar terminal 800a according to the second example differs from the busbar terminal 800 according to the first example in that the busbar terminal 800a includes a protrusion formed to have a step structure.

Referring to FIGS. 13 to 17, the busbar terminal 800a according to the second example includes a body part 810a electrically connected to end portions of coils 330 and a power terminal part 820 coupled to the body part 810a. In this case, the body part 810a may include a body 811, terminals 812 coupled to the coils 330, and a protrusion 815 protruding from an upper surface 811a of the body 811 in an axial direction. The protrusion 815 may be referred to as a second protruding part.

When the protrusion 815 is compared with the protrusion 813 of the busbar terminal 800 according to the first example, there is a difference in that an upper end portion is bent outward to form the step structure. That is, instead of the protrusion 813 of the busbar terminal 800 according to the first example, the protrusion 815 of the busbar terminal 800a according to the second example may be disposed on the body 811.

Referring to FIGS. 14 and 17, the protrusion 815 may include a first protruding part 816 formed to extend from the upper surface 811a of the body 811 in the axial direction and a second protruding part 817 bent outward from an end portion of the first protruding part 816. Accordingly, an inner surface 816a of the first protruding part 816 and an inner surface 817a of the second protruding part may be disposed such that an offset O is formed in a radial direction. In addition, the step structure may be formed at the protrusion 815 due to the offset O.

An upper surface 816b of the first protruding part 816 may be in contact with a lower surface of a first region 821 of the power terminal part 820. In addition, the first protruding part 816 may support a lower end portion of the power terminal part 820. Accordingly, the power terminal part 820 may be disposed to be spaced a predetermined distance d from the upper surface 811a of the body 811 in the axial direction.

The inner surface 817a of the second protruding part 817 may be in contact with an outer surface 821a of the first region 821. In addition, the first region 821 and the protrusion 815 may be coupled through a fusing process. In this case, the inner surface 817a of the second protruding part 817 may be the contact surface or fusing surface described above.

The upper surface 817b of the second protruding part 817 may be in contact with a lower surface of a second region 822 of the power terminal part 820. In addition, the second protruding part 817 may support the second region 822, and thus, an amount of contact between the body part 810 and the power terminal part 820 may be increased.

Meanwhile, a thickness t2 of the second protruding part 817 in the radial direction may be smaller than a thickness t1 of the first protruding part 816 in the radial direction. For example, through a molding process such as a pressing process, the thickness t 2 of the second protruding part 817 in the radial direction may be reduced. Accordingly, a ratio that the second protruding part 817 and the power terminal part 820 are occupied in the radial direction may be reduced through the fusing process to decrease a contact possibility of another busbar terminal 800a.

FIG. 18 is a view illustrating a modified example of the body part of the busbar terminal according to the second example disposed in the motor according to the first embodiment.

Referring to FIG. 18, a body part 810a may further include guides 814 which guide a power terminal part 820.

The guides 814 may be provided as two protrusions disposed to be spaced apart from each other in a circumferential direction on an upper surface 817b of a second protruding part 817. Accordingly, the guides 814 may be referred to as guide protrusions.

Each of the guide protrusions may be formed to protrude from the upper surface 817b of the second protruding part 817 in an axial direction. The guide protrusion may be disposed to face a side surface of a second region 822 in the circumferential direction.

Busbar Terminal According to Third Example

Figure 20:
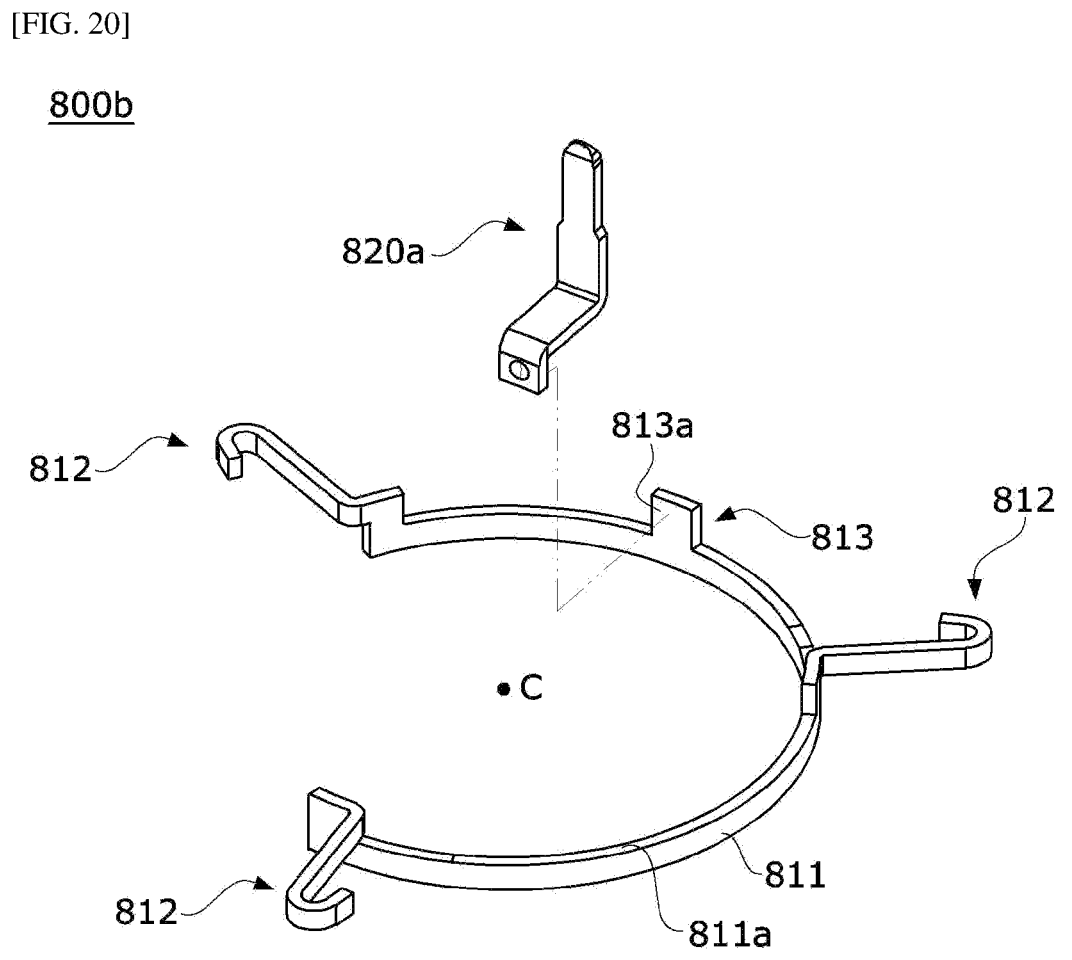

FIG. 19 is a perspective view illustrating a third example of the busbar terminal disposed in the motor according to the first embodiment, and FIG. 20 is an exploded perspective view illustrating the third example of the busbar terminal disposed in the motor according to the first embodiment. FIG. 21 is a plan view illustrating the third example of the busbar terminal disposed in the motor according to the first embodiment, and FIG. 22 is a side view illustrating the third example of the busbar terminal disposed in the motor according to the first embodiment. FIG. 23 is a cross-sectional view along line D-D of FIG. 21 and FIG. 24 is a view illustrating a power terminal part of the busbar terminal according to the third example disposed in the motor according to the first embodiment.

In describing a busbar terminal 800b according to the third example with reference to FIGS. 19 to 24, since the same components as those of the busbar terminal 800 according to the first example may be assigned to the same numerals, detailed descriptions thereof will be omitted.

When the busbar terminal 800 according to the first example and the busbar terminal 800b according to the third example are compared, there is a difference in shape between power terminal parts coupled to body parts 810. For example, in consideration of robustness of coupling through a fusing process, there is a difference in that a power terminal part 820a of the busbar terminal 800b according to the third example includes an embossing structure.

Referring to FIGS. 19 to 24, the busbar terminal 800*b* according to the third example includes a body part 810 electrically connected to end portions of coils 330 and a power terminal part 820*a* coupled to the body part 810.

In this case, the power terminal part 820*a* includes a first region 821, a second region 822 extending from an end portion of the first region 821 in a radial direction, a third region 823 extending from an end portion of the second region 822 in an axial direction, and an embossing 824 formed to protrude from an outer surface 821*a* of the first region 821 in the radial direction.

The embossing 824 may be formed to protrude toward a protrusion 813 in the radial direction. The embossing 824 may be disposed to be in contact with an inner surface 813*a* of the protrusion 813.

The embossing 824 may be formed in a molding manner of pressing an inner surface of the first region 821 so that a part of the outer surface 821*a* protrudes.

As illustrated in FIG. 24, the embossing 824 may be formed in a hemispherical shape. Accordingly, the embossing 824 may be in point contact with the inner surface 813*a* of the protrusion 813. Accordingly, during a fusing process, since a current density increases at a contact point P of the protrusion 813 and the embossing 824, and the fusing process begins from the contact point P, a fixing force between the body part 810 and the power terminal part 820*a* is increased.

In describing the busbar terminal 800*b* according to the third example, the busbar terminal 800*b* according to the third example has been described based on the body part 810 of the busbar terminal 800 according to the first example but is not necessarily limited thereto. For example, the body part 810*a* of the busbar terminal 800*a* according to the second example may be applied instead of the body part 810 of the busbar terminal 800 according to the first example.

The sensor part 900 may detect rotation of the shaft 500 by detecting a magnetic force of a sensing magnet installed to operate in conjunction with rotation of the rotor 400 to determine a present position of the rotor 400.

The sensor part 900 may include a sensing magnet assembly 910 and a printed circuit board (PCB) 920.

The sensing magnet assembly 910 is coupled to the shaft 500 to operate in conjunction with the rotor 400 to detect the position of the rotor 400. In this case, the sensing magnet assembly 910 may include sensing magnets and a sensing plate.

The sensing magnets may include main magnets disposed in a circumferential direction to be adjacent to a hole forming an inner circumferential surface and sub-magnets formed at an edge.

The main magnets may be disposed in the same manner as drive magnets inserted into the rotor 400 of the motor.

The sub-magnets may be subdivided further than the main magnets and formed to have many poles. Accordingly, the sub-magnets allow rotational angles to be divided and measured more precisely and the motor to be driven more smoothly.

The sensing plate may be formed of a metal material having a disc shape. The sensing magnets may be coupled to an upper surface of the sensing plate. In addition, the sensing plate may be coupled to the shaft 500. In this case, a hole through which the shaft 500 passes may be formed in the sensing plate.

On the PCB 920, a sensor which detects a magnetic force of the sensing magnets may be disposed. In this case, the sensor may be provided as a Hall integrated circuit (IC). In addition, the sensor may detect a change in an N pole and an S pole of the sensing magnets to generate a sensing signal. Accordingly, the PCB 920 on which the Hall IC is disposed may be referred to as a sensing assembly or position detecting device.

Second Embodiment

A direction parallel to a longitudinal direction (vertical direction) of a shaft will be referred to as an axial direction, a direction perpendicular to the axial direction will be referred to as a radial direction with respect to the shaft, and a direction along a circle having a radius in the radial direction will be referred to as a circumferential direction with respect to the shaft.

A motor according to a second embodiment may include a housing 100, a cover 200, a stator 300, a rotor 400, a shaft 500, a busbar 600, and the like. In this case, the shaft 500 may be formed of a hollow member.

The busbar 600 of the motor according to the second embodiment may include a busbar holder 1700 and busbar terminals 1800.

The busbar holder 1700 supports the busbar terminals 1800. The busbar holder 1700 may be an annular member including the busbar terminals 1800 therein. In this case, the busbar holder 1700 is a component corresponding to the busbar body of the motor according to the first embodiment and may be referred to as a busbar body.

The busbar terminals 1800 may be disposed on the stator 300. The busbar terminals 1800 are electrically connected to coils 330. In addition, the busbar terminals 1800 may be connected to an external power source.

FIG. 25 is a view illustrating a busbar terminal and the busbar holder of the motor according to the second embodiment, FIG. 26 is a plan view illustrating the busbar terminal of the motor according to the second embodiment, and FIG. 27 is a plan view illustrating a busbar having an overlap region of busbar terminals of the motor according to the second embodiment.

Referring to FIGS. 25 and 26, the busbar terminals 1800 are disposed inside the busbar holder 1700. In addition, one end portions of the busbar terminals 1800 are disposed to be exposed at an outer surface of the busbar holder 1700 to be connected to the coils 330. Regions at which one end portions of the busbar terminals 1800 are in contact with the coils 330 may be equally exposed at an outer circumferential surface of the busbar holder 1700 in the radial direction. The other end portions of the busbar terminals 1800 may be disposed to be exposed at an upper surface of the busbar holder 1700 to be connected to the external power source.

The plurality of busbar terminals 1800 may be divided into a first group G1, a second group G2, and a neutral busbar 1800N. The first group G1 and the second group G2 may include the busbar terminals 1800 to which U-, V-, and W-phase power sources are connected. The first group G1 and the second group G2 may be disposed to be electrically separated. The coils 330 in contact with the busbar terminals 1800 of the first group G1 and the coils 330 in contact with the busbar terminals 1800 of the second group G2 may be disposed to be electrically separated.

The first group G1 may include a first busbar terminal 1800A, a second busbar terminal 1800B, and a third busbar terminal 1800C. The first busbar terminal 1800A, the second busbar terminal 1800B, and the third busbar terminal 1800C may be connected to the U-, V-, and W-phase power sources, respectively. In addition, the second group G2 may include a fourth busbar terminal 1800D, a fifth busbar terminal 1800E, and a sixth busbar terminal 1800F. The fourth busbar terminal 1800D, the fifth busbar terminal 1800E, and the sixth busbar terminal 1800F may be connected to the U-, V-, and W-phase power sources, respectively.

The first group G1 and the second group G2 may be spatially separately disposed.

Hereinafter, features of the busbar terminal 1800, which will be described, correspond to common features of the busbar terminals 1800 of the first group G1 and the second group G2.

FIG. 28 is an exploded view illustrating the busbar terminal 1800 illustrated in FIG. 26, and FIG. 29 is a perspective view illustrating the assembled busbar terminal.

Referring to FIGS. 28 and 29, the busbar terminal 1800 may include a first body 1810 and a second body 1820. The first body 1810 and the second body 1820 may be provided as separate components, and the first body 1810 may be mechanically coupled to the second body 1820, or the first body 1810 may be coupled to the second body 1820 by welding. In this case, the first body 1810 may be a component corresponding to the power terminal part 820 of the motor according to the first embodiment, and the second body 1820 may be a component corresponding to the body part 810 of the motor according to the first embodiment. Accordingly, the first body 1810 may be referred to as a power terminal part, and the second body 1820 may be referred to as a body part.

The first body 1810 may be a straight band-shaped member. One end portion of the first body 1810 may be connected to the external power source, and the other end portion may be coupled to the second body 1820 by welding. The first body 1810 may be in contact with and be welded to any one of two bent end portions of the second body 1820.

The second body 1820 may be a band-shaped member in which an uneven pattern is repeated. The second body 1820 includes a curved portion 1821 constituting a body of the busbar terminal 1800 and end portions 1822 connected to the coils 330. Each of the end portions 1822 may be formed by bending two end portions of the curved portion 1821 outward. Ends 1822a of the end portions 1822 are bent in a ring shape, and end portions of the coils 330 are positioned therein. All shapes and sizes of the second bodies 1820 of the busbar terminals 1800 disposed in the first group G1 and the second group G2 may be the same.

The first body 1810 may be twisted and coupled to the second body 1820. This is because a direction in which one end portion 1811 is connected to the external power source and a direction in which the other end portion 1812 is welded to the second body 1820 are different, and thus the first body 1810 may be twisted and disposed to match the directions.

A degree of twist of the first body 1810 may be set in consideration of a difference in degree between the direction of one end portion 1811 connected to the external power source and the direction of the other end portion 1812 welded to the second body 1820. All the degrees of twist of the first bodies 1810 of the busbar terminals 1800 may be the same, but the present invention is not limited thereto, and the first bodies 1810, of which degrees of twist are different in consideration of directions of one end portions 1811 of the first bodies 1810 connected to the external power sources or directions of the other end portions 1812 welded to the first bodies 1810, may also be disposed. Since the first body 1810 does not have a bending region as described above, there are advantages that a process for bending can be omitted, and a development having a shape capable of greatly reducing the number of scrapes to be discarded.

Meanwhile, twist directions of the first bodies 1810 of the busbar terminals 1800 disposed in the first group G1 may be the same. Twist directions of the first bodies 1810 of the busbar terminals 1800 disposed in the second group G2 may be the same. On the other hand, the twist directions of the second bodies 1820 of the busbar terminals 1800 disposed in the first group G1 and the twist directions of the second bodies 1810 of the busbar terminals 1800 disposed in the second group G2 may be different.

FIG. 30 is an exploded view illustrating the busbar terminal 1800 shown in FIG. 26 that includes the first body 1810 having a bent shape, and FIG. 31 is a perspective view illustrating an assembled busbar terminal 1800 which is the busbar terminal 1800 of FIG. 30.

Referring to FIGS. 30 and 31, in some of the plurality of busbar terminals 1800, the first body 1810 may be formed in a bent shape instead of the twist shape. Accordingly, the busbar terminal 1800 having the twisted first body 1810 and the busbar terminal 1800 having the bent first body 1810 may be combined. A bending direction and the number of bending of the first body 1810 may be set in consideration of a degree of a difference between a direction of one end portion 1811 connected to the external power source and a direction in which the other end portion 1812 welded to the first body 1810.

Referring to FIGS. 26 to 31, each of the first busbar terminal 1800A and the second busbar terminal 1800B may have the twisted first body 1810. In addition, each of the fourth busbar terminal 1800D, the fifth busbar terminal 1800E, and the sixth busbar terminal 1800F may also have the twisted first body 1810. However, the third busbar terminal 1800C may have the bent first body 1810 unlike the other busbars.

Meanwhile, as illustrated in FIG. 26, the busbar terminals 1800 of the first group G1 may be disposed so that a curvature center CA of the first busbar terminal 1800A, a curvature center CB of the second busbar terminal 1800B, and a curvature center CC of the third busbar terminal 1800C are different. However, the second bodies 1820 of the first group G1 may be disposed to be spiral when the busbar terminals 1800 are viewed in the axial direction in order to allow positions of the ends 1822a of the end portions thereof in contact with the coils 330 to be the same in the radial direction.

Accordingly, as illustrated in FIG. 27, in the axial direction of the shaft 500, an end portion 1822 of the second busbar terminal 1800B and the first body 1810 of the first busbar terminal 1800A may form an overlap region O1. In addition, an end portion 1822 of the third busbar terminal 1800C and the second body 1820 of the first busbar terminal 1800A may form an overlap region 02, and the end portion 1822 of the third busbar terminal 1800C and the second body 1820 of the second busbar terminal 1800B may form an overlap region 02. Based on the second body 1820 of the second busbar terminal 1800B, the first busbar terminal 1800A may be disposed at an outermost side portion, the third busbar terminal 1800C may be disposed at an innermost side, and the second busbar terminal 1800B may be disposed between the first busbar terminal 1800A and the third busbar terminal 1800C in the radial direction.

On the other hand, as illustrated in FIG. 26, the busbar terminals 1800 of the second group G2 may be disposed so that a curvature center CD of the fourth busbar terminal 1800D, a curvature center CE of the fifth busbar terminal 1800E, and a curvature center (CF) of the sixth busbar terminal 1800F are different. The second body 1820 of the second group G2 may be disposed to be spiral when the busbar terminal 1800 is viewed in the axial direction in order to allow positions of the ends 1822a of the end portions thereof in contact with the coils 330 to be the same in the radial direction. In the axial direction of the shaft 500, an end portion 1822 of the fifth busbar terminal 1800E and the first body 1810 of the fourth busbar terminal 1800D may form an overlap region O1. In addition, an end portion 1822 of the sixth busbar terminal 1800F and the second body 1820 of the fourth busbar terminal 1800D may form an overlap region 02, and an end portion 1822 of the sixth busbar terminal 1800F and the second body 1820 of the fifth busbar terminal 1800E may form an overlap region 02. Based on the second body 1820, the fourth busbar terminal 1800D may be disposed at an outermost side, the sixth busbar terminal 1800F may be disposed at an innermost side, and the fifth busbar terminal 1800E may be disposed between the fourth busbar terminal 1800D and the sixth busbar terminal 1800F in the radial direction.

FIG. 32 is a development view illustrating a plate member forming the second body 1820 of the busbar terminal 1800.

Referring to FIG. 32, the second body 1820 of the busbar terminal 1800 is manufactured by pressing a plate member 10 according to a pattern of the development. In a region of the plate member 10, a region having a band shape in which an uneven shape is repeated is a first region 11 for forming the second body 1820 of the busbar terminal 1800, and the remaining region S is a region to be discarded as a scrap. Since the plate member 10 includes a pattern, in which shapes of developments having a predetermined width are sequentially formed without a structure from which the first region 11 is branched off or a structure protruding for bending at all, a width L1 of the plate member 10 can be greatly reduced. Accordingly, there is an advantage of not only reducing a size of the plate member 10, but also greatly reducing the amount of scraps to be discarded.

FIG. 33 is a development view illustrating the plate member 20 forming the first body 1810 of the busbar terminal 1800.

Referring to FIG. 33, the plate member 20 forming the first body 1810 may be a plate member 20 cut to correspond to a size of the first body 1810 which does not need an additional pattern of a development. A width L2 of the plate member 20 may be the same as a width of the first body 1810. Accordingly, scraps to be discarded may not be generated at all while the first body 1810 is manufactured.

FIG. 34 is an enlarged plan view illustrating a cross-sectional shape of the busbar terminal 1800.

Referring to FIG. 34, the second body 1820 of the busbar terminal 1800 may be disposed such that a width SW in the axial direction is greater than a width RW3 in the axial direction. That is, the busbar terminal 1800 may be disposed so that the second body 1820 stands. In the twisted first body 1810, a cross section of one end portion 1811 connected to the external power source may be formed so that a width CW1 in the circumferential direction is greater than a width RW1 in the radial direction. On the other hand, in the twisted first body 1810, a cross section of the other end portion 1812 welded to the first body 1810 may be formed so that a width CW2 in the circumferential direction is smaller than a width RW 2 in the radial direction.

The third busbar terminal 1800C has the first body 1810 having a bent shape. In the third busbar terminal 1800C, a cross section of one end portion 1811 connected to the external power source may be spaced apart from a cross section of the other end portion 1812 welded to the first body 1810.

In the above-described embodiment, an example of an inner rotor type motor has been described, but the present invention is not limited thereto. The present invention may also be applied to an outer rotor type motor. In addition, the present invention can be used in various devices such as vehicles or home appliances.

| [Reference Numerals] |
| --- |
| 100: HOUSING |
| 200: COVER |
| 300: STATOR |
| 400: ROTOR |
| 500: SHAFT |
| 600: BUSBAR |
| 700: BUSBAR BODY |
| 800: BUSBAR TERMINAL |
| 810: BODY PART |
| 811: BODY |
| 812: TERMINAL |
| 813, 815: PROTRUSION |
| 814: GUIDE |
| 820: POWER TERMINAL PART |
| 824: EMBOSSING |
| 900: SENSOR PART |
| 1800A: FIRST BUSBAR TERMINAL |
| 1800B: SECOND BUSBAR TERMINAL |
| 1800C: THIRD BUSBAR TERMINAL |
| 1800D: FOURTH BUSBAR TERMINAL |
| 1800E: FIFTH BUSBAR TERMINAL |
| 1800F: SIXTH BUSBAR TERMINAL |
| 1810: FIRST BODY |
| 1820: SECOND BODY |

The invention claimed is:

1. A motor comprising:

a stator;

a rotor disposed to correspond with the stator;

a shaft coupled to the rotor; and a busbar disposed above the stator, wherein the busbar includes a busbar body and a plurality of busbar terminals disposed on the busbar body, wherein each of the busbar terminals includes a body part and a power terminal part coupled to the body part, wherein the body part includes a body, a plurality of terminals disposed on the body, and a protrusion protruding from an upper surface of the body in an axial direction, wherein one lower surface of the power terminal part is in contact with an inner surface of the protrusion, wherein body parts of the plurality of busbar terminals are disposed to be spaced a predetermined gap (G) away from each other in a radial direction; and wherein a partial inner portion of the power terminal part overlaps with the gap (G) in the axial direction, wherein the protrusion further includes a guide which guides the power terminal part, and wherein the guide is provided as two protrusions disposed on an upper surface of the protrusion to be spaced apart from each other in a circumferential direction.

2. The motor of claim 1, wherein a lower end of the power terminal part is disposed to be spaced a predetermined distance (d) away from the upper surface of the body in the axial direction.

3. The motor of claim 2, wherein the power terminal part includes:

a first region disposed to be spaced the predetermined distance (d) away from the upper surface of the body;

a second region extending from an end portion of the first region in a radial direction; and a third region extending from an end portion of the second region in the axial direction, wherein an outer surface of the first region is in contact with the inner surface of the protrusion, and a lower surface of the second region is in contact with an upper surface of the protrusion.

4. The motor of claim 2, wherein the power terminal part includes:

a first region disposed to be spaced the predetermined distance (d) away from the upper surface of the body;

a second region extending from an end portion of the first region in a radial direction;

a third region extending from an end portion of the second region in the axial direction; and an embossing protruding from an outer surface of the first region, wherein the embossing is in contact with the inner surface of the protrusion, and a lower surface of the second region is in contact with an upper surface of the protrusion.

5. The motor of claim 4, wherein the embossing is formed in a hemispherical shape and is in point contact with the inner surface of the protrusion.

6. A motor comprising:

a stator;

a rotor disposed to correspond with the stator;

a shaft coupled to the rotor; and a busbar disposed above the stator, wherein the busbar includes a busbar body and a plurality of busbar terminals disposed on the busbar body, wherein each of the busbar terminals includes a body part and a power terminal part coupled to the body part, wherein the body part includes a body, a plurality of terminals disposed on the body, and a protrusion protruding from an upper surface of the body in an axial direction, wherein one lower surface of the power terminal part is in contact with an inner surface of the protrusion, wherein body parts of the plurality of busbar terminals are disposed to be spaced a predetermined gap (G) away from each other in a radial direction, wherein a partial inner portion of the power terminal part overlaps with the gap (G) in the axial direction, wherein:

the protrusion includes a first protruding part formed to extend from the upper surface of the body in the axial direction and a second protruding part extending to be bent outward from an end portion of the first protruding part;

the power terminal part includes a first region disposed to be spaced a predetermined distance (d) away from the upper surface of the body, a second region extending from an end portion of the first region in a radial direction, and a third region extending from an end portion of the second region in the axial direction; and an inner surface of the second protruding part is in contact with an outer surface of the first region.

7. The motor of claim 6, wherein a thickness (t2) of the second protruding part in the radial direction is smaller than a thickness (t1) of the first protruding part in the radial direction.

8. The motor of claim 6, wherein the protrusion further includes a guide which guides the power terminal part.

9. The motor of claim 8, wherein the guide is provided as two protrusions disposed on an upper surface of the protrusion to be spaced apart from each other in a circumferential direction.

* * * * *